United States Patent
Zong et al.

(10) Patent No.: US 12,392,601 B2
(45) Date of Patent: Aug. 19, 2025

(54) CUTTER HOLDER MEASURING TOOL, CUTTER HOLDER DETECTING SYSTEM AND METHOD FOR DETECTING CUTTER HOLDER POSE PARAMETER

(71) Applicants: JIANGSU XCMG CONSTRUCTION MACHINERY RESEARCH INSTITUTE LTD., Xuzhou (CN); XUZHOU XUGONG ROAD CONSTRUCTION MACHINERY CO., LTD, Xuzhou (CN)

(72) Inventors: Xuemei Zong, Xuzhou (CN); Shujing Wang, Xuzhou (CN); Kaixuan Kang, Xuzhou (CN); Baohai Sun, Xuzhou (CN)

(73) Assignees: JIANGSU XCMG CONSTRUCTION MACHINERY RESEARCH INSTITUTE LTD., Jiangsu (CN); XUZHOU XUGONG ROAD CONSTRUCTION MACHINERY CO., LTD, Jiangsu (CN)

( * ) Notice: Subject to any disclaimer, the term of this patent is extended or adjusted under 35 U.S.C. 154(b) by 439 days.

(21) Appl. No.: 17/991,606

(22) Filed: Nov. 21, 2022

(65) Prior Publication Data

US 2023/0373050 A1 Nov. 23, 2023

(30) Foreign Application Priority Data

May 20, 2022 (CN) .......................... 202210549702.X

(51) Int. Cl.
*G01B 11/10* (2006.01)
*G01B 11/00* (2006.01)

(52) U.S. Cl.
CPC ................................. *G01B 11/002* (2013.01)

(58) Field of Classification Search
CPC ......... G01B 11/08; G01B 11/10; G01B 11/24; G01B 11/30
(Continued)

(56) References Cited

U.S. PATENT DOCUMENTS 4,532,716 A * 8/1985 Steiner .................... G01B 5/061
33/DIG. 2
6,449,864 B1 * 9/2002 Newman .............. B26D 7/2628
144/225

(Continued)

FOREIGN PATENT DOCUMENTS

| AU | 2001270761 B2 | 9/2006 |
| AU | 2013100451 A4 | 5/2013 |

(Continued)

*Primary Examiner* — George B Bennett
(74) *Attorney, Agent, or Firm* — Tucker Ellis LLP

(57) ABSTRACT

A cutter holder measuring tool includes: a base with a positioning point configured to be detected by a detecting device; and a mounting assembly, including a sleeve, a positioning pin and an end plate, wherein two axial ends of the sleeve are connected to the base and the end plate respectively, the end plate is configured to abut against a mounting surface of a cutter holder of a milling rotor, the mounting surface is a surface, facing a tip of a cutter, of the cutter holder, the positioning pin is inserted into the sleeve and a mounting hole, for the cutter to insert, of the cutter holder, the positioning pin is movable along an axial direction of the sleeve, and a diameter of the positioning pin changes along the axial direction of the sleeve, so a center of the positioning pin is collinear with a center of the mounting hole.

15 Claims, 6 Drawing Sheets

(58) Field of Classification Search
USPC .................................. 33/551, 553, 628, 630
See application file for complete search history.

(56) References Cited

U.S. PATENT DOCUMENTS

| | | | | |
|---|---|---|---|---|
| 6,543,150 | B2* | 4/2003 | Matsumiya | ............ G01B 7/012 |
| | | | | 33/DIG. 13 |
| 6,796,050 | B2* | 9/2004 | Haimer | ............... B23B 31/1179 |
| | | | | 33/639 |
| 7,891,104 | B2* | 2/2011 | Muellner | ............. B23Q 17/002 |
| | | | | 33/366.11 |
| 8,520,066 | B2* | 8/2013 | Chang | ................ G01B 11/2408 |
| | | | | 348/92 |
| 9,381,610 | B2* | 7/2016 | Gordon | .................... G01C 9/34 |
| 11,752,587 | B2* | 9/2023 | Trifoni | ................. B23Q 9/0007 |
| | | | | 33/626 |
| 12,135,209 | B2* | 11/2024 | Propheter-Hinckley | ..................... |
| | | | | G01B 5/008 |
| 2004/0098221 | A1* | 5/2004 | Katamachi | ............ G01B 11/00 |
| | | | | 702/157 |
| 2021/0078848 | A1 | 3/2021 | Nocchi | |
| 2021/0095954 | A1* | 4/2021 | Gibb | .................... G01B 5/0004 |
| 2021/0116228 | A1 | 4/2021 | Hamner | |
| 2023/0311263 | A1* | 10/2023 | Seichter | ............... B23Q 11/126 |
| | | | | 33/626 |
| 2024/0080946 | A1* | 3/2024 | Haimer | .................. G01K 13/00 |

FOREIGN PATENT DOCUMENTS

| | | |
|---|---|---|
| CN | 105618985 A | 6/2016 |
| CN | 206356633 A | 7/2017 |
| CN | 207662548 U | 7/2018 |
| CN | 109024204 A | 12/2018 |
| CN | 110216427 A | 9/2019 |
| CN | 110561434 A | 12/2019 |
| CN | 110954037 A | 4/2020 |
| CN | 113048949 A | 6/2021 |
| CN | 114184121 A | 3/2022 |
| DE | 1904240 U | 11/1964 |
| DE | 102011000314 A1 | 7/2012 |
| EP | 3062505 A1 | 8/2016 |
| JP | 10953936 A | 2/1997 |

* cited by examiner

CUTTER HOLDER MEASURING TOOL, CUTTER HOLDER DETECTING SYSTEM AND METHOD FOR DETECTING CUTTER HOLDER POSE PARAMETER

CROSS-REFERENCE TO RELATED APPLICATION

The present disclosure claims the priority of Chinese Application No. 202210549702.X, filed in the Chinese Patent Office on May 20, 2022, whose entire contents are herein incorporated by reference.

FIELD OF THE INVENTION

The present application relates to the technical field of milling rotor parameter measurement, and in particular, to a cutter holder measuring tool, a cutter holder detecting system and a method for detecting cutter holder pose parameter.

BACKGROUND OF THE INVENTION

A cutter holder is an important part of a milling rotor, and positioning accuracy of the cutter holder directly affects construction performance of the milling rotor.

In order to determine the positioning accuracy of the cutter holder, it is generally necessary to measure the pose parameters of all the cutter holders on the milling rotor before leaving the factory, so as to determine whether the cutter holders meet the design requirement.

However, the number of cutter holders on the milling rotor is large, therefore, how to realize an accurate measurement of the cutter holder pose parameters conveniently and efficiently is always a difficult problem.

SUMMARY OF THE INVENTION

The present application aims to provides a cutter holder measuring tool, a cutter holder detecting system and a method for detecting cutter holder pose parameter, so as to realize an accurate measurement of the cutter holder pose parameters conveniently and efficiently.

In order to achieve the above objective, the cutter holder measuring tool provided by the present application includes:
a base with a positioning point configured to be detected by a detecting device; and
a mounting assembly, including a sleeve, a positioning pin and an end plate, wherein two axial ends of the sleeve are connected to the base and the end plate respectively, the end plate is configured to abut against a mounting surface of a cutter holder of a milling rotor, the mounting surface is a surface, facing a tip of a cutter, of the cutter holder, the positioning pin is inserted into the sleeve and a mounting hole, for the cutter to insert, of the cutter holder, the positioning pin is movable along an axial direction of the sleeve, and a diameter of the positioning pin changes along the axial direction of the sleeve, so that a center of the positioning pin is collinear with a center of the mounting hole.

In some embodiments, the positioning pin is configured as at least one of the following:
the diameter of the positioning pin decreases or increases along a direction from the base to the end plate;
a maximum diameter of the positioning pin is larger than a design value of the diameter of the mounting hole by a first deviation value, and a minimum diameter of the positioning pin is less than the design value of the diameter of the mounting hole by a second deviation value; and
the positioning pin is tapered.

In some embodiments, the first deviation value is equal to the second deviation value; and/or, a taper of the positioning pin is greater than 0° and less than or equal to 5°.

In some embodiments, the cutter holder measuring tool includes at least one of the following:
an elastic member, arranged in the sleeve to apply an elastic force to the positioning pin to drive the positioning pin to move out of the sleeve;
a magnetic member, arranged on the sleeve to apply a magnetic force to the mounting surface through the end plate, so that the end plate is adsorbed on the mounting surface;
a limiting part, arranged on an inner wall of the sleeve to limit a displacement of the positioning pin extending out of the sleeve;
an operating button, connected to the base and/or the mounting assembly and configured to be in a signal connection with the detecting device, so as to trigger the detecting device to detect the positioning point when being operated; and
a handle, connecting the base with the sleeve.

In some embodiments, the base is provided with a plurality of point units, and each of the point units includes at least one positioning point.

In some embodiments, at least two of the plurality of point units are on different planes; and/or, each of the point units includes at least two positioning points, and the at least two positioning points in the same point unit are coplanar.

In addition, the cutter holder detecting system provided by the present application includes a detecting device and the cutter holder measuring tool according to any one of the embodiments, wherein the detecting device is configured to detect the positioning point on the base to determine coordinates of the positioning point.

In some embodiments, the detecting device includes two cameras.

In some embodiments, the cutter holder detecting system includes a detection member, wherein the detection member is provided with a calibration point configured to be detected by the detecting device, the detection member is configured to be in contact with the milling rotor and the mounting assembly, and cooperate with the detecting device to determine centers of end faces of flanges on two axial sides of the milling rotor and a projection of the center of the positioning pin on a bottom surface of the end plate, and the bottom surface of the end plate is a surface of the end plate for being in contact with the cutter holder.

In some embodiments, the detection member includes a base plate and a measuring head, the calibration point is arranged on the base plate, the measuring head is connected to the base plate and is spherical, and the detection member is configured to be in contact with the milling rotor and the mounting assembly through the measuring head.

In addition, the method provided by the present application for detecting a cutter holder pose parameter using the cutter holder detecting system according to any one of the embodiments, includes:
fixing the cutter holder measuring tool at a position outside the milling rotor, and calibrating the cutter holder measuring tool to determine coordinates of the positioning point, a tip representing point and a representing normal vector on the cutter holder measuring tool under a calibration coordinate, wherein the tip representing point is a point, for representing the tip of the cutter mounted on the cutter holder, on the cutter holder measuring tool, the representing normal vector is a vector, for representing a mounting normal vector of the cutter holder, on the cutter holder measuring tool, the mounting normal vector is a normal vector of the mounting surface of the cutter holder, and the calibration coordinate system is a coordinate system established at a position outside the milling rotor where the cutter holder measuring tool is located;

establishing a workpiece coordinate system of the milling rotor; and mounting the cutter holder measuring tool on the cutter holder, detecting the positioning point with the detecting device to determine the coordinates of the positioning point under the workpiece coordinate system, and determining coordinates of the tip representing point and the representing normal vector under the workpiece coordinate system based on the determined coordinates of the positioning point under the workpiece coordinate system and the determined coordinates of the positioning point, the tip representing point and the representing normal vector under the calibration coordinate system, so as to determine a pose parameter of the cutter holder where the cutter holder measuring tool is located to obtain an detecting parameter of the cutter holder, wherein the pose parameter of the cutter holder includes at least one of a milling radius, an axial distance, a circumferential angle, a mounting angle and a roll angle.

In some embodiments, calibrating the cutter holder measuring tool to determine coordinates of the positioning point cutter, the tip representing point and the representing normal vector on the cutter holder measuring tool under the calibration coordinate system includes:

detecting the positioning point on the cutter holder measuring tool by the detecting device to determine the coordinates of the positioning point under the calibration coordinate system;

determining a projection point P2 of the center of the positioning pin on a bottom surface of the end plate, wherein the bottom surface of the end plate is a surface of the end plate configured to be in contact with the cutter holder;

translating the projection point P2 towards right above by a preset distance L to obtain P0 corresponding to coordinates of the tip representing point under the calibration coordinate system; and taking a connecting line of P2 and P0 as the representing normal vector P2P0, and determining the coordinates of the representing normal vector P2P0 under the calibration coordinate system.

In some embodiments, determining the projection point P2 of the center of the positioning pin on the bottom surface of the end plate includes:

making a detection member of the cutter holder detecting system be in contact with a plurality of points on the bottom surface, and detecting a calibration point on the detection member by the detecting device when the detection member is in contact with each of the plurality of points on the bottom surface so as to measure the bottom surface;

making the detection member be in contact with a plurality of points on a cylindrical surface of the positioning pin, and detecting the calibration point on the detection member by the detecting device when the detection member is in contact with each of the plurality of points on the cylindrical surface of the positioning pin so as to measure each point, in contact with the detection member, on the cylindrical surface of the positioning pin; and projecting each measured point on the cylindrical surface of the positioning pin on the measured bottom surface and determining the projection point P2 based on the corresponding projection.

In some embodiments, establishing the workpiece coordinate system of the milling rotor includes:

determining centers of end faces of flanges on two axial sides of the milling rotor; and taking a connecting line of the centers of the end faces of the flanges on the two axial sides of the milling rotor as a Z axis, translating the center of the end face of the flange on one side of the milling rotor towards the middle by a preset distance t along the Z axis to serve as an original point O, and passing through the original point O to draw any straight line perpendicular to the Z axis to serve as an X axis, so as to obtain the workpiece coordinate system OXYZ of the milling rotor.

In some embodiments, determining the centers of the end faces of the flanges on the two axial sides of the milling rotor includes:

making a detection member of the cutter holder detecting system be in contact with a plurality of points on the end faces of the flanges on the two axial sides of the milling rotor and a plurality of points on a cylindrical surface of the milling rotor, and detecting a calibration point on the detection member with the detecting device when the detection member is in contact with each of the plurality of points on the milling rotor so as to determine the centers of the end faces of the flanges on the two axial sides of the milling rotor.

In some embodiments, making the detection member be in contact with a plurality of points on the end faces of the flanges on the two axial sides of the milling rotor and a plurality of points on the cylindrical surface of the milling rotor, and detecting the calibration point on the detection member with the detecting device when the detection member is in contact with each of the plurality of points on the milling rotor so as to determine the centers of the end faces of the flanges on the two axial sides of the milling rotor includes:

making the detection member be in contact with the plurality of points of the end faces of the flanges on the two axial sides of the milling rotor, and detecting the calibration point on the detection member by the detecting device when the detection member is in contact with each of the plurality of points on the end faces of the flanges on the two axial sides of the milling rotor so as to measure the end faces of the flanges on the two axial sides of the milling rotor;

making the detection member be in contact with the plurality of points on the cylindrical surface of the milling rotor, and detecting the calibration point on the detection member with the detecting device when the detection member is in contact with each point on the cylindrical surface of the milling rotor so as to measure each point, in contact with the detection member, on the cylindrical surface of the milling rotor; and projecting each measured point on the cylindrical surface of the milling rotor on the measured end faces of the flanges, and determining the centers of the end faces of the flanges on the two axial sides of the milling rotor based on the corresponding projection.

In some embodiments, determining coordinates of the tip representing point and the representing normal vector under the workpiece coordinate system based on the determined coordinates of the positioning point under the workpiece coordinate system and the determined coordinates of the positioning point, the tip representing point and the representing normal vector under the calibration coordinate system includes:

establishing a transformation matrix between the calibration coordinate system and the workpiece coordinate system according to the determined coordinates of the positioning point under the calibration coordinate system and the workpiece coordinate system; and based on the determined transformation matrix, transforming the coordinates of the tip representing point under the calibration coordinate system into the coordinates of the tip presenting point under the workpiece coordinate system, and transforming the coordinates of the representing normal vector under the calibration coordinate system into the coordinates of the representing normal vector under the workpiece coordinate system, so as to determine the coordinates of the tip representing point and the representing normal vector under the workpiece coordinate system.

In some embodiments, the method for detecting the cutter holder pose parameter includes:

mounting the cutter holder measuring tool on various cutter holders of the milling rotor to obtain detected parameters of all cutter holders of the milling rotor.

In some embodiments, the cutter holder pose parameter detecting method includes:

determining a manufacturing deviation of each cutter holder based on the detected parameters and design parameters of all the cutter holders.

In some embodiments, determining the manufacturing deviation of each cutter holder based on the detecting parameters and the design parameters of all the cutter holders includes:

determining a design parameter of each cutter holder based on the detecting parameters and the design parameters of all the cutter holders; and making difference between the detecting parameter of each cutter holder and the corresponding design parameter to obtain the manufacturing deviation of each cutter holder.

In some embodiments, determining the design parameter of each cutter holder based on the detecting parameters and the design parameters of all the cutter holders includes:

determining a circumferential rotation angle required by a transformation from the workpiece coordinate system to a design coordinate system, wherein the design coordinate system is a coordinate system corresponding to the design parameters;

changing circumferential angles in the detected parameters of all the cutter holders by the circumferential rotation angle to obtain processed parameters of all the cutter holders;

making differences between the processed parameter of each cutter holder and the design parameters of all the cutter holders; and taking the design parameter with a minimum absolute difference value with each cutter holder in the design parameters of all the cutter holders as the design parameter of the corresponding cutter holder.

In some embodiments, determining the circumferential rotation angle required by the transformation from the workpiece coordinate system to the design coordinate system includes:

sequencing the detected parameters of all the cutter holders according to an order of each cutter holder in a Z direction;

after sequencing, finding any cutter holder of which an axial distance is in a larger difference from axial distances of preceding and following cutter holders to serve as a reference cutter holder;

determining a design parameter corresponding to a design axial distance closest to a detected axial distance corresponding to the reference cutter holder as the design parameter of the reference cutter holder; and making a difference value between the circumferential angle in the design parameter of the reference cutter holder and the circumferential angle in the detected parameter of the reference cutter holder, and taking the corresponding difference value between the corresponding circumferential angles as the circumferential rotation angle.

The cutter holder measuring tool are self-centered and self-oriented based on the positioning pin and the end face when being mounted on the cutter holder, therefore, it's convenient to realize an accurate measurement of the cutter holder pose parameter efficiently.

Other features and advantages of the present application will become apparent by the detailed description for exemplary embodiments of the present application with reference to the following accompany drawings.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DETAILED DESCRIPTION OF THE EMBODIMENTS

Figure 1:
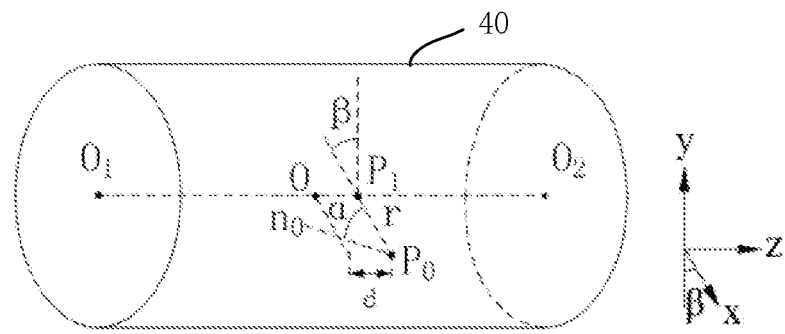
FIG. 1 is a schematic diagram of a calculation model of a cutter holder pose parameter.

The technical solutions in the embodiments of the present application will be clearly and completely described below in conjunction with the accompanying drawings in the embodiments of the present application. Apparently, the described embodiments are merely some rather than all of the embodiments. The following description of the at least one exemplary embodiment is actually merely illustrative and never constitutes any limitation to the present application and application or use thereof. All other embodiments obtained by a person of ordinary skill in the art based on the embodiments of the present application without creative efforts shall fall within the protection scope of the present application.

Technologies, methods and equipment known to those of ordinary skill in the related field may not be discussed in detail, but, where appropriate, the technologies, methods and equipment should be regarded as a part of the specification.

In the description of the present application, it should be understood that an azimuth or position relationship indicated by azimuth words "front, rear, upper, lower, left, right", "transverse, longitudinal, vertical, horizontal, "top, bottom" and the like is generally an azimuth or position relationship based on the accompanying draws, which is only for facilitating description of the present application and simplifying description. In the absence of a statement to the contrary, these azimuth words do not indicate and imply that the referred device or component must have a specific azimuth or perform construction and operation in the specific azimuth; therefore, it cannot be interpreted as a limitation to the protection scope of the present application. The azimuth words "inner, outer" refer to the inside and outside relative to the outline of each component itself.

In the description of the present application, it should be understood that the words "first", "second" and the like for limiting parts are merely for convenience of distinguishing corresponding parts. Unless otherwise stated, the above words do not have special meanings and cannot be construed as limitations to the protection scope of the present application.

In addition, the technical features involved in the different embodiments of the present invention described below may be combined with each other as long as they do not constitute a conflict with each other.

With continuous and high-speed construction of infrastructure, milling construction equipment such as road maintenance machinery, tunnel boring machinery and diaphragm wall trench milling machinery are applied more and more widely, and requirement for the performance of the milling construction equipment is higher and higher.

Some milling equipment, such as a milling machine, a cold recycling machine, a boring machine and a double-wheel groove-milling machine, adopts a rotary milling and crushing operation mode, and working devices of these milling equipment are referred to as milling rotors. The milling rotor of the milling machine is also referred to as a milling-planing wheel; the milling rotor of the cold recycling machine is also referred to as a milling-mixing rotor; the milling rotor of the boring machine is also referred to as a cutting head; and the milling rotor of the double-wheel groove milling machine is also referred to as a milling wheel.

Figure 2:
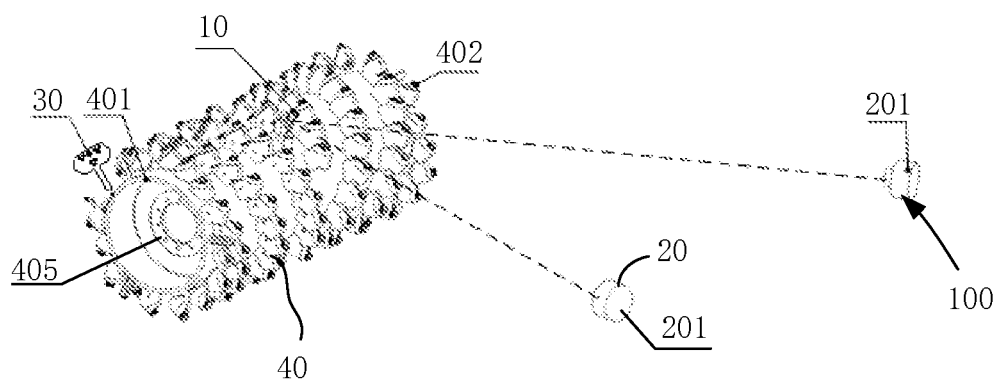
FIG. 2 shows a structure of a cutter holder detecting system according to an embodiment of the present application.

FIG. 2 shows part of structures of a milling rotor. Referring to FIG. 2, the milling rotor 40 generally includes a drum 401, a flange 405, cutter holders 402 and cutters (not shown in the figure). The drum 401 is cylindrical and rotatably arranged. The flange 405 is arranged in the drum 401. Generally, two axial sides of the drum 401 are both provided with flanges 405, that is, the milling rotor 40 includes two flanges 405 located on two axial sides. The cutter holders 402 are arranged on the drum 401 by means of welding, etc. The cutters are mounted on the cutter holder 402 so as to realize an installation on the drum 401. Specifically, referring to FIG. 4, the cutter holder 402 is internally provided with a mounting hole 404, the cutter is inserted into the mounting hole 404, a tip of the cutter is located above the cutter holder 402, and the cutter is pressed on an upper surface of the cutter holder 402, so that the upper surface of the cutter holder 402 serves as a mounting surface 403 of the cutter holder 402. The mounting surface 403 faces the tip of the cutter.

When working, the drum 401 rotates, and the cutters on the drum 401 mill and crush a milling and crushing medium (such as asphalt, cement, ore or rock soil), so that objectives of road maintenance, tunnel boring and diaphragm wall milling are achieved.

It can be seen that the milling rotor 40 is a core part of the milling construction equipment. Therefore, the performance of the milling rotor 40 directly affects the performance of the milling construction equipment.

The milling rotor 40 has a complex structure, many positioning parameters and high manufacturing difficulty, therefore, the performance of the milling rotor 40 is affected not only by the design level, but also by the manufacturing level.

In the manufacturing process of the milling rotor 40, the positioning accuracy of the cutter holder 402 is a very important index.

The positioning accuracy of the cutter holder 402 directly affects the pose of the cutter so as to affect the construction performance, therefore, it is necessary to detect the pose parameter of the cutter holder 402 to determine whether the positioning accuracy of the cutter holder 402 meets the design requirement, thereby determining whether the produced milling rotor 40 meets the requirement and avoiding the influence on the performance of the milling rotor 40 caused by excessive difference between the actual pose parameter and the designed pose parameter of the cutter holder 402.

The pose parameter of the cutter holder 402 includes parameters such as a milling radius, an axial distance, a circumferential angle, a mounting angle, a roll angle. The milling radius, the axial distance, the circumferential angle, the mounting angle and the roll angle are defined respectively as follows:

the milling radius refers to a distance from a tip point on the cutter to a gyration center of the milling rotor;

the axial distance refers to a Z-direction coordinate value of the tip point under the workpiece coordinate system of the milling rotor;

the circumferential angle (namely the circumferential angle under the cylindrical coordinate system) refers to an angle between a connecting line of the projection of the tip point on the XOY plane and the original point O and the X axis under the cylindrical coordinate system;

the mounting angle refers to an angle between a mounting normal vector of the cutter holder and the milling radius; and the roll angle refers to an angle between a plane formed by the mounting normal vector of the cutter holder and the milling radius and an end face of the flange of the milling rotor.

The workpiece coordinate system refers to a space coordinate system established by taking the gyration center O of the milling rotor as the original point and the axial direction of the milling rotor as the Z axis. The mounting normal vector of the cutter holder refers to a normal vector of the mounting surface of the cutter holder.

For facilitating to determine the pose parameter of the cutter holder 402, a calculation model of the cutter holder pose parameter shown in FIG. 1 is established according to the definitions of the above parameters.

Referring to FIG. 1, if under the workpiece coordinate system, the tip point is $P_0$, the Z-axis coordinate of the tip is d, a projection point of the tip point $P_0$ on the Z axis is $P_1$, the mounting normal vector is $n_0$, the coordinates of $P_0$ are $(x_0, y_0, z_0)$, the coordinates of the mounting normal vector $n_0$ are $(w_0, p_0, r_0)$, then calculation formulas of the milling radius r, the axial distance d, the circumferential angle θ, the mounting angle α and the roll angle β are respectively:

the milling radius:

$$r = \frac{|\overrightarrow{P_0O_1} \times \overrightarrow{O_1O_2}|}{\overrightarrow{O_1O_2}} = \sqrt{x_0^2 + y_0^2};$$

the axial distance: $d = P_1 - O = z_0$;
the circumferential angle:

$$\theta = \begin{cases} (\text{When } x_0 \geq 0,) \bmod\left(\tan^{-1}\left(\frac{y_0}{x_0}\right), 360\right) \\ (\text{When } x_0 < 0,) \tan^{-1}\left(\frac{y_0}{x_0}\right) + 180 \end{cases};$$

the mounting angle:

$$\alpha = \cos^{-1}\left(\frac{\overrightarrow{P_0P_1} \cdot \overrightarrow{n_0}}{|\overrightarrow{P_0P_1}||\overrightarrow{n_0}|}\right) = \cos^{-1}\left(\frac{(x_0, y_0, 0) \cdot (w_0, p_0, r_0)}{\sqrt{x_0^2 + y_0^2} \cdot \sqrt{w_0^2 + p_0^2 + r_0^2}}\right);$$

the roll angle:

$$\beta = \cos^{-1}\left(\frac{(\overrightarrow{P_0P_1} \times \vec{n}) \cdot \overrightarrow{O_1O_2}}{|\overrightarrow{P_0P_1} \times \vec{n}||\overrightarrow{O_1O_2}|}\right) = \cos^{-1}\left(\frac{((x_0, y_0, 0) \times (w_0, p_0, r_0)) \cdot (0, 0, 1)}{|(x_0, y_0, 0) \times (w_0, p_0, r_0)|}\right)$$

It can be seen from the above formulas that these parameters such as the milling radius r, the axial distance d, the circumferential angle θ, the mounting angle α and the roll angle β are all related to the coordinates of the tip and the mounting normal vector under the workpiece coordinate system.

Therefore, the pose parameter of the cutter holder 402 can be detected by determining the coordinates of the tip and the mounting normal vector under the workpiece coordinate system and substituting the corresponding coordinates into the calculation formula of each parameter.

However, it is very difficult to directly detect the coordinates of the tip and the mounting normal vector under the workpiece coordinate system, in particular, the number of the cutter holders 402 and the cutters on the milling rotor 40 is large, generally up to dozens or even hundreds. Therefore, if the mounting normal vector of each cutter holder 402 and the tip point of the cutter on each cutter holder 402 are directly detected, the difficulty is high, the workload is large, the efficiency is low and it is difficult to meet the pre-delivery detecting requirement of all the milling rotor products, resulting in that only casual detecting can be adopted, an outgoing quality of all products cannot be ensured, a work quality and efficiency of the milling rotor are affected, and a market public praise and a competitiveness of the milling construction equipment are affected.

In view of the above cases, the applicant provides a cutter holder detecting system, a cutter holder measuring tool and a method for detecting a cutter holder pose parameter, so as to achieve an accurate measurement of the pose parameter of the cutter holder conveniently and efficiently, thereby facilitating the pre-delivery detecting of all the milling rotors and reliably ensuring the quality and the performance of the milling rotor and the milling construction equipment.

FIG. 2 to FIG. 10 exemplarily show structures and a working principle of the cutter holder detecting system and the cutter holder measuring tool in the present application.

Referring to FIG. 2 to FIG. 10, in the present application, the cutter holder detecting system 100 includes a cutter holder measuring tool 10. The cutter holder measuring tool 10 is configured to be detachably mounted on the cutter holder 402 to replace the cutter on the cutter holder 402, thereby facilitating to achieve the measurement of the tip and the mounting normal vector.

When the cutter holder measuring tool 10 is mounted on the cutter holder 402, a relative position of the cutter holder measuring tool 10 and the cutter holder 402 is fixed, such that the cutter holder measuring tool 10 can represent the cutter to a certain degree, and a point (referred to as a tip representing point) corresponding to the tip and a vector (referred to as a representing normal vector) corresponding to the mounting normal vector are present on the cutter holder measuring tool 10. Therefore, the tip and the mounting normal vector can be measured under the workpiece coordinate system by determining coordinates of the tip representing point and the representing normal vector under the workpiece coordinate system, so that the pose parameter of the cutter holder 402 is determined conveniently based on the coordinates of the tip and the mounting normal vector under the workpiece coordinate system, thereby realizing the detection of the pose parameter of the cutter holder 402.

In the whole detecting process, the cutter holder measuring tool 10 mounted on the cutter holder 402 replaces the cutter, so that it is only necessary to pre-determine the workpiece coordinate system and pre-calibrate the relative position relationship between the tip representing point and a positioning point 12, and the relative position relationship between the representing normal vector and the positioning point 12, and then detect the coordinates of the positioning point 12 (that is, the coordinates of the positioning point 12 under the workpiece coordinate system) when the cutter holder measuring tool 10 is mounted on each cutter holder 402, such that the pose parameters of all the cutter holders 402 are measured conveniently, and it is unnecessary to directly detect the tip point and the mounting normal vector corresponding to each cutter holder 402; therefore, a detecting efficiency of the cutter holder pose parameter is effectively improved, which is convenient to detect all the milling rotors before leaving the factory, and control all the delivered milling rotors to meet the design requirement, thereby improving the product quality, the market public praise and the market competitiveness.

Figure 3:
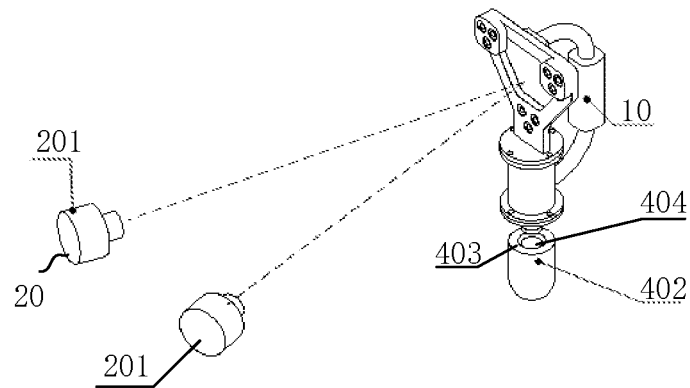
FIG. 3 shows a relationship among a cutter holder measuring tool, an detecting device and a cutter holder according to an embodiment of the present application.
Figure 4:
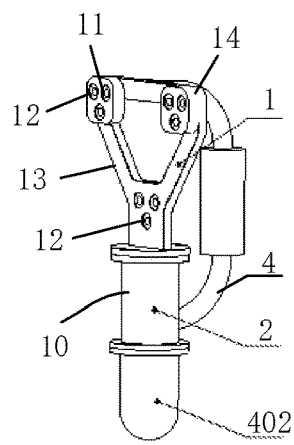
FIG. 4 is a perspective view of a combined structure of a cutter holder measuring tool and a cutter holder according to an embodiment of the present application.

It is difficulty to directly detect and determine the coordinates of the tip representing point and the representing normal vector, therefore, in order to determine the coordinates of the tip representing point and the representing normal vector conveniently, referring to FIG. 2 to FIG. 4, in some embodiments, the cutter holder measuring tool 10 is provided with a positioning point 12, so that the coordinates of the tip representing point and the representing normal vector can be determined indirectly by detecting the coordinates of the positioning point 12.

It may be understood that when the coordinates of the tip representing point and the representing normal vector are determined based on the coordinates of the positioning point 12, it is necessary to determine the relative position relationship between the positioning point 12 and the tip representing point, and the relative position relationship between the positioning point 12 and the representing normal vector. Furthermore, when the coordinates of the tip representing point and the representing normal vector under the workpiece coordinate system based on the coordinates of the positioning point 12 under the workpiece coordinate system, it is also necessary to determine the workpiece coordinate system.

In order to detect the coordinates of the positioning point 12 conveniently, referring to FIG. 2 to FIG. 3, in some embodiments, the cutter holder detecting system 100 not only includes the cutter holder measuring tool 10, but also includes a detecting device 20. The positioning point 12 is configured to be detected by the detecting device 20. For example, in some embodiments, the positioning point 12 is configured as a sticker in round shape, and different colors of inner rings and outer rings are drawn on the sticker, so that the positioning point 12 can be paste on the cutter holder measuring tool 10, and the detecting device 20 can detect the positioning point 12 to determine the coordinates of the positioning point 12. As an example of the detecting device 20, referring to FIG. 2 and FIG. 3, the detecting device 20 is a photographing device and includes two cameras 201. During measurement, the relative positions of the two cameras 201 and the cutter holder measuring tool 10 are kept fixed, so that the three-dimensional coordinates of the positioning point 12 can be detected based on binocular vision and triangulation principles. The binocular vision and triangulation principles are known technologies, so the binocular vision and triangulation principles will not be introduced further in the present application.

In addition, in order to conveniently determine the relative position relationship between the positioning point 12 and the tip representing point and the relative position relationship between the positioning point 12 and the representing normal vector, and conveniently establish the workpiece coordinate system, referring to FIG. 2, in some embodiments, the cutter holder detecting system 100 not only includes the cutter holder measuring tool 10 and the detecting device 20, but also includes a detection member 30 with a calibration point 305. The detection member 30 is configured to be in contact with the milling rotor 40 and the cutter holder measuring tool 10 and cooperate with the detecting device 20 to determine the relative position relationship between the positioning point 12 and the tip representing point, the relative position relationship between the positioning point 12 and the representing normal vector and the workpiece coordinate system. When the detection member 30 is in contact with the milling rotor 40 and the cutter holder measuring tool 10, the detecting device 20 detects the calibration point 305 on the detection member 30 to determine the workpiece coordinate system, and the relative position relationship between the positioning point 12 and the tip representing point and the relative position relationship between the positioning point 12 and the representing normal vector and the workpiece coordinate system.

When the detection member 30 is in contact with a plurality of points of end faces of flanges 405 of the milling rotor 40 and a plurality of points of a cylindrical surface (that is, a cylindrical surface of a drum 401) of the milling rotor 40, the detecting device 20 detects the calibration point 305 on the detection member 30 to measure the end faces of the flanges 405 and determine the centers of the end faces of the flanges 405. In this way, referring to FIG. 1, after the centers O1 and O2 of the end faces of the flanges on the two axial sides of the milling rotor 40 being determined, the Z axis and the original point O of the workpiece coordinate system can be determined based on O1 and O2, so that the workpiece coordinate system OXYZ can be established.

Specifically, making the detection member 30 be in contact with a plurality of points (such as three, four or more points) on the end face of the flange 405, and detecting the calibration point 305 of the detection member 30 with the detecting device 20 when the detection member 30 is in contact with each plurality of points on the end face of the flange 405, then the plurality points on the end face of the flange 405 are measured. On such basis, the plane feature of the end faces of the flanges 405 can be determined by fitting the plurality of points on the measured end face of the flange 405, so that the end face of the flange 405 can be measured. Furthermore, making the detection member 30 be in contacted with a plurality of points (such as three, fourth or more points) on the cylindrical surface of the milling rotor 40, and detecting the calibration point 305 of the detection member 30 with the detecting device 20 when the detection member 30 is in contact with each point on the cylindrical surface of the milling rotor 40, then the plurality of points on the cylindrical surface of the milling rotor 40 are measured. On such basis, a circle located on the end face of the flange 405 can be fitted by projecting the measured plurality of points on the cylindrical surface of the milling rotor 40 to the measured end face of the flange 405, so that the center of the end face of the flange 405 can be determined based on the obtained circle. The two flanges 405 on the two axial sides of the milling rotor 40 are both detected by this method, then the centers, that is, O1 and O2, of the two flanges 405 can be determined. As can be seen, based on the cooperation between the detection member 30 and the detecting device 20, the centers O1 and O2, which have non-solid features, of the end faces of the flanges can be measured, so that the measurement problem of the hole center with the non-solid feature is cleverly solved.

After O1 and O2 are obtained, the Z axis can be obtained by connecting O1 and O2; furthermore, translating O1 or O2 towards a middle along the Z axis by a preset distance t (the preset distance t is a distance between the flange 405 and the center of the milling rotor 40 and may be pre-determined according to the design parameter of the milling rotor 40), and then the center O, that is, the original point O of the workpiece coordinate system, of the milling rotor 40 is obtained. After the Z axis and the original point O are obtained, any straight line which is perpendicular to the Z axis and passes through the original point O is drawn to serve as an X axis, for example, a connecting line between the original point O and a projection point of any tip point on a plane (that is, an OXY plane) perpendicular to the Z axis may serve as the X axis, and then the workpiece coordinate OXYZ of the milling rotor 40 can be established.

In addition, making the detection member 30 be in contact with a plurality of points (such as three, four or more points) on the cutter holder measuring tool 10, and when the detection member 30 is in contact with each of the plurality of points on the cutter holder measuring tool 10, detecting the calibration point 305 on the detection member 30 with the detecting device 20 to determine the positions of the tip representing point and the representing point vector. In combination of the determined positions of the tip representing point and the representing point vector with the coordinates of the positioning point 12 measured by the detecting device 20, the relative position relationship between the positioning point 12 and the tip representing point and the relative position relationship between the positioning point 12 and the representing normal vector can be calibrated, so that during actual measurement on each cutter holder 402, the coordinates of the tip and the representing normal vector ca be determined based on the measured coordinates of the positioning point 12 and the pre-calibrated relative position relationship between the positioning point 12 and the tip representing point and the pre-calibrated relative position relationship between the positioning point 12 and the representing normal vector.

As can be seen, a calibration of the tip representing point and the representing normal vector on the cutter holder measuring tool 10 is an important link in the process of detecting the pose parameter of the cutter holder 402. Whether the calibration of the tip representing point and the representing normal vector is efficient and accurate affects the efficiency and the accuracy of the process of detecting the pose parameter of the cutter holder.

In order to calibrate the tip representing point and the representing normal vector efficiently and accurately, the present application provides a cutter holder measuring tool 10.

FIG. 3 to FIG. 7 exemplarily show the structure of the cutter holder measuring tool 10.

Referring to FIG. 3 to FIG. 7, in some embodiments, the cutter holder measuring tool 10 includes a base 1 and a mounting assembly 2.

The base 1 is provided with a positioning point 12 which is configured to be detected by the detecting device 20. As an example, the base 1 is provided with a plurality of point units 11, and each of the point units 11 includes at least one positioning point 12. For example, referring to FIG. 4, in some embodiments, the point unit 11 includes at least two positioning points 12. In this way, the base 1 is provided with at least three positioning points 12, which is beneficial to improve the detecting accuracy, and in particular can meet the requirement of establishing a coordinate transformation matrix. Exemplarily, at least two point units 11 of all the point units 11 on the base 1 are on different planes, that is, at least two point units 11 are located on different planes. For example, referring to FIG. 4 and FIG. 5, in some embodiments, the base 1 is provided with three point units 11, two of which are located on the same plane and have an offset S with the remaining point unit 11 in a thickness direction of the base 1, so that one point unit 11 and the other two point units 11 are located on different planes. In this way, it is more convenient for the detecting device 20 to identify the positioning point 12 and improve the detecting accuracy. In addition, when the point unit 11 includes at least two positioning points 12, the at least two positioning points 12 in the same point unit 11 are coplanar, so that the detecting accuracy is improved.

The mounting assembly 2 is connected to the base 1 and is configured to be connected to the cutter holder 402, so that the cutter holder measuring tool 10 is mounted on the cutter holder 402. Referring to FIG. 3 to FIG. 7, in some embodiments, the mounting assembly 2 includes a sleeve 21, a positioning pin 22 and an end plate 23. Two axial ends of the sleeve 21 are connected to the base 1 and the end plate 23 respectively. The end plate 23 is configured to abut against a mounting surface 403 (that is, a surface, facing the tip of the cutter, of the cutter holder 402) of the cutter holder 402. The positioning pin 22 is inserted into the sleeve 21 and a mounting hole 404, for the cutter to insert, of the cutter holder 402. Furthermore, the positioning pin 22 is movable along an axial direction of the sleeve 21 and a diameter of the positioning pin 22 changes along with the axial direction of the sleeve 21, so that centers of the positioning pin 22 and the mounting hole 404 are collinear.

The end plate 23 abuts against the mounting surface 403 of the cutter holder 402, therefore, a pose of a surface (referred to as a bottom surface 231), for abutting against the mounting surface 403, of the end plate 23 is consistent with that of the mounting surface 403. In this way, plane features of the mounting surface 403 can be measured by measuring plane features of the bottom surface 231. Furthermore, a normal vector of the bottom surface 231 is consistent with a normal vector of the mounting surface 403, on such basis, the normal vector of the bottom surface 231 can represent the normal vector of the mounting surface 403, that is, the normal vector of the bottom surface 231 can serve as the representing normal vector for representing the mounting normal vector of the cutter holder 402. It can be seen that the end plate 23 can orientate the cutter holder measuring tool 10 in the process that the cutter holder measuring tool 10 is mounted to the cutter holder 402.

Figure 9:
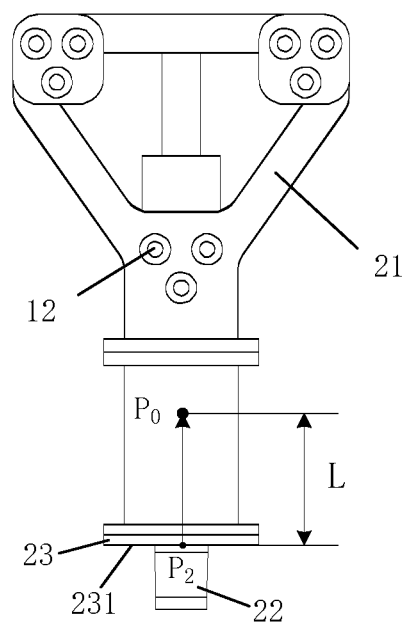
FIG. 9 is a schematic diagram of determining a tip representing point and a representing normal vector according to the present application.

The positioning pin 22 is inserted into the mounting hole 404 of the cutter holder 402, therefore, a diameter of the positioning pin 22 is matched with a diameter of the mounting hole 404. In this case, if the centers of the positioning pin 22 and the mounting hole 404 are collinear, a projection of the center of the positioning pin 22 on the mounting surface 403 is consistent with a projection of the center of the mounting hole 404 on the mounting surface 403. In this way, the projection of the center of the mounting hole 404 on the mounting surface 403 can be determined by determining the projection of the center of the positioning pin 22 on the mounting surface 403. Further, since the mounting surface 403 is parallel with the bottom surface 231, the projection of the center of the mounting hole 404 on the mounting surface 403 can be determined by determining the projection of the center of the positioning pin 22 on the bottom surface 231. Referring to FIG. 9, assuming that the projection of the center of the mounting hole 404 on the mounting surface 403 is P2, then the tip representing point can be determined as P0 which is a corresponding point after the point P2 is translated towards the right above by a preset distance L (the preset distance L is a distance between the tip point and the mounting surface 403 and can be pre-determined) P0. Further, the representing normal vector P2P0 can be obtained based on P2 and P0. In this way, once the coordinates of the positioning point 12 is detected, the relative position relationship between the tip representing point P0 and the positioning point 12 and the relative position relationship between the representing normal vector P2P0 and the positioning point 12 can be determined.

It can be seen that the centers of the positioning pin 22 and the mounting hole 404 are collinear, which is the key to accurately determine the relative position relationship between the tip representing point P0 and the positioning point 12 and the relative position relationship between the representing normal vector P2P0 and the positioning point 12. The better the collinearity between the centers of the positioning pin 22 and the mounting hole 404, the more accurate the detecting result of the cutter holder pose parameter, the higher the detecting accuracy. It is easy to understand that the fact that the center of the locating pin 22 is collinear with the center of the mounting hole 404 means a central axis of the locating pin 22 is collinear with a central axis of the mounting hole 404. It is easy to understand that the fact that the center of the locating pin 22 is collinear with the center of the mounting hole 404 means that the central axis of the locating pin 22 is collinear with the central axis of the mounting hole 404.

In the present application, the centers of the positioning pin 22 and the mounting hole 404 are made collinear not only by the shaft hole cooperation between the positioning pin 22 and the mounting hole 404, but also by designing the positioning pin 22 in a special way. The positioning pin 22 is configured to be movable along the axial direction of the sleeve 21, and the diameter of the positioning pin 22 changes along with the axial direction of the sleeve 21. In this way, the positioning pin 22 realizes self centering while being inserted into the mounting hole 404, which not only reduces assembling and adjusting time between the cutter holder measuring tool 10 and the cutter holder 402, but also compensates a processing deviation of the mounting hole 404, thereby improving the collinearity of the centers of the positioning pin 22 and the mounting hole 404, and enhancing the measurement accuracy of the cutter older pose parameter.

In a processing process of the mounting hole 404, there is inevitably manufacturing error, and a deviation may be present between the actual value and the design value of the diameter of the mounting hole 404, for example, a deviation within 0.1 mm may be present. Therefore, the positioning pin 22 is configured to be movable along the axial direction of the sleeve 21 and the diameter of the positioning pin 22 changes along the axial direction of the sleeve 21, then during insertion into the mounting hole 404, the positioning pin 22 can move along the axial direction of the sleeve 21 along with the change of the diameter of the mounting hole 404, and then adjust parts matching the mounting hole 404 by itself, such that the positioning pin 22 and the mounting hole 404 can exactly cooperate at the part where the diameters are matched, and the centers of the positioning pin 22 and the mounting hole 404 cannot be affected by the processing deviation of the mounting hole 404 and are always located on the same straight line.

In the above process, the positioning pin 22 can be self-centered in the process of being inserted into the mounting hole 404, and there is no need to artificially adjust the assembling relationship between the positioning pin 22 and the mounting hole 404, therefore, it is more time-saving and labor-saving, and it is beneficial to improve the detecting efficiency. Moreover, in the self-centering process, the positioning pin 22 can compensate the processing deviation of the mounting hole 404 through the axial movement and the changed diameter, so as to improve the collinearity of the centers of the positioning pin 22 and the mounting hole 404, therefore, it is beneficial to improve the measurement accuracy of the cutter holder pose parameter.

In addition, based on the orientation function of the end plate 23 and the self-centering function of the positioning pin 22, the cutter holder measuring tool 10 can be mounted on the cutter holder 402 only by fitting the end plate 23 with the mounting surface 403 of the mounting hole 404 and inserting the positioning pin 22 into the mounting hole 404, and other operations such as rotation are not required, therefore, it is simple to operate, which is also beneficial to improve the detecting convenience and the detecting efficiency.

Meanwhile, the self-orienting function of the end plate 23 and the self-centering function of the positioning pin 22 also enable the cutter holder measuring tool 10 to have high assembling consistency when being assembled with different cutter holders 402, which is also beneficial to improve the detecting accuracy.

As can be seen, the cutter holder measuring tool 10 provided by the present application has the self-centering and self-orienting functions and can accurately represent the tip and the mounting normal vector, so that the cutter holder pose parameter can be detected efficiently and accurately, all the milling rotors 40 can be detected conveniently before leaving factory to ensure all the delivered milling rotors 40 to meet the design requirement, thereby improving the product quality and the market public praise.

The diameter of the positioning pin 22 may be varied in various forms. As long as the variation form of the diameter of the positioning pin 22 is consistent with the variation form of the diameter of the mounting hole 404, such that the centers of the positioning pin 22 and the mounting hole 404 are collinear.

For example, in some embodiments, the diameter of the positioning pin 22 decreases along a direction from the base 1 to the end plate 23. In this case, the positioning pin 22 is particularly suitable for the situation where the diameter of the mounting hole 404 decreases along the direction from the base 1 to the end plate 23.

For another example, in some other embodiments, the diameter of the positioning pin 22 increases along the direction from the base 1 to the end plate 23. In this case, the positioning pin 22 is particularly suitable for the situation where the diameter of the mounting hole 404 increases along the direction from the base 1 to the end plate 23.

Figure 7:
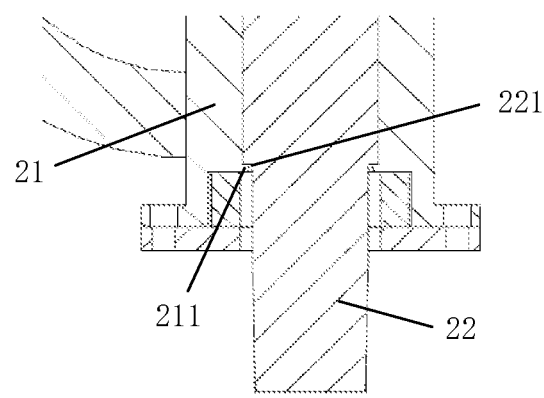
FIG. 7 is a partially enlarged schematic diagram of FIG. 6 at a limiting part.

In addition, referring to FIG. 7, in some embodiments, the positioning pin 22 is tapered. For example, in some embodiments, the positioning pin 22 is a tapered pin with a taper φ greater than 0° and less than or equal to 5°. In this way, the diameter of the positioning pin 22 changes linearly in the axial direction, which is more in line with the general change trend of the diameter of the mounting hole 404, so that the self-centering function can be realized more conveniently and reliably. When the positioning pin 22 is tapered, the diameter of the positioning pin 22 may decrease along the direction from the base 1 to the end plate 23, or may increase along the direction from the base 1 to the end plate 23.

In order to make the positioning pin 22 have a better self-centering function, the diameter of the positioning pin 22 may be designed based on the design value of the diameter of the mounting hole 404. For example, in some embodiments, the positioning pin 22 is designed such that its maximum diameter is larger than the design value of the diameter of the mounting hole 404 by a first deviation value, and its minimum diameter is less than the design value of the diameter of the mounting hole 404 by a second deviation value. In this way, the positioning pin 22 can better compensate for the processing deviation of the mounting hole 404 so as to perform self centering more reliably. The first deviation value and the second deviation value may be equal or unequal. When the first deviation value is equal to the second deviation value, the positioning pin 22 is processed and manufactured more simply and conveniently, and the positioning pin 22 can realize the self-centering function more reliably.

Figure 5:
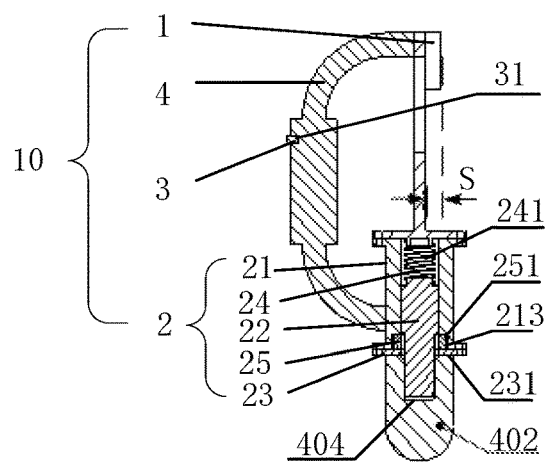
FIG. 5 is a sectional view of a combined structure of a cutter holder measuring tool and a cutter holder according to an embodiment of the present application.

In addition, referring to FIG. 5 and FIG. 7, in some embodiments, the mounting assembly 2 not only includes the sleeve 21, the end plate 23 and the positioning pin 22, but also includes at least one of a limiting part 211, an elastic member 24 and a magnetic member 25.

The limiting part 211 is arranged on an inner wall of the sleeve 21 to limit a displacement of the positioning pin 22 extending out of the sleeve 21. As an example, referring to FIG. 7, the limiting part 211 protrudes inwards from the inner wall of the sleeve 21 to form a limiting platform, the positioning pin 22 is provided with a shaft shoulder 221, and when the shaft shoulder 221 is pressed on an upper end face (that is, a surface, facing the base 1, of the limiting part 211) of the limiting part 211, the limiting part 211 prevents the positioning pin 22 from continuously extending outwards so as to limit the maximum extending displacement of the positioning pin 22. In this way, the positioning pin 22 is prevented from extending out of the sleeve 21 excessively, thereby avoiding such excessive extension to affect the centering accuracy, or even to cause the positioning pin 22 to come out of the sleeve 21 to affect the structural stability.

The elastic member 24 (such as a spring 241) is arranged in the sleeve 21 to apply an elastic force to the positioning pin 22 to drive the positioning pin 22 to move out of the sleeve 21. In this way, when the diameter of the mounting hole 404 changes, the elastic member 24 does not prevent the positioning pin 22 from self-adjusting the extending length and self-centering by moving relative to the sleeve 21; moreover, after the positioning pin 22 moves in place relative to the sleeve 21, the elastic member 24 can apply a pressing force to the positioning pin 22, so that the positioning pin 22 is stably kept at the required position for accurate centering. In addition, in a case that the aforementioned limiting part 211 is arranged on the inner wall of the sleeve 21, before the positioning pin 22 is inserted into the mounting hole 404, the elastic member 24 can press the positioning pin 22 on the limiting part 211 to achieve a more reliable limiting effect.

The magnetic member 25 (such as a magnet 251) is arranged on the sleeve 21 to apply a magnetic force to the mounting surface 403 through the end plate 23, so that the end plate 23 is adsorbed on the mounting surface 403. The end plate 23 can fit on the mounting surface 403 more reliably under the action of the magnetic member 25, so that the assembling stability of the cutter holder measuring tool 10 and the cutter holder 402 is effectively improved, and the orientation accuracy of the cutter holder measuring tool 10 is improved.

In a case that the mounting assembly 2 includes the magnetic member 25, the positioning pin 22 may be made of a non-magnetic material or a material with weak magnetic conductivity, so that an influence on the positioning pin 22 by the magnetic member 25 is reduced, and the influence on the centering accuracy caused by the fact that the positioning pin 22 is adsorbed on the mounting hole 404 under the action of the magnetic member 25 is avoided.

Figure 6:
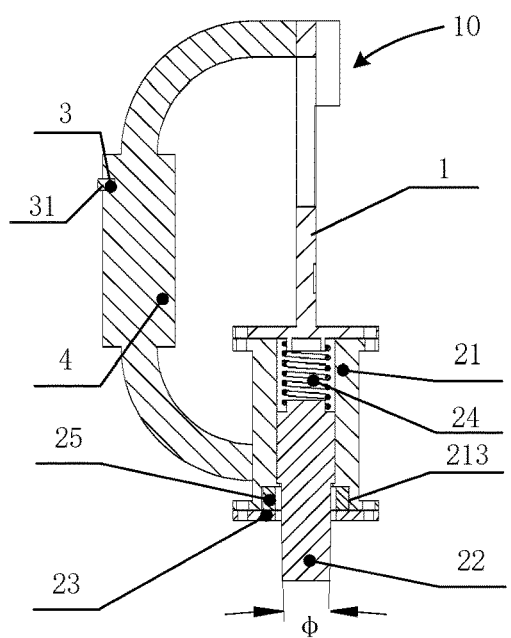
FIG. 6 is a sectional view of a cutter holder measuring tool according to an embodiment of the present application.

In addition, referring to FIG. 4 to FIG. 6, in some embodiments, the cutter holder measuring tool 10 not only includes the base 1 and the mounting assembly 2, but also includes at least one of a handle 4 and an operating button 3.

The handle 4 is connected to the base 1 and the sleeve 21, which is not only convenient to grasp, but also beneficial to improve the stability of the relative position of the base 1 and the sleeve 21, thereby a structural stability of the cutter holder measuring tool 10 being enhanced.

The operating button 3 (such as a press button 31 or a knob) is connected to at least one of the base 1 and the mounting assembly 2 and is configured to be in a signal connection with the detecting device 20, so as to trigger the detecting device 20 to detect the positioning point 12 when being operated. In this way, it is more convenient to trigger the detecting device 20 to detect the positioning point 12. When the cutter holder measuring tool 10 includes the handle 4, the operating button 3 may be arranged on the handle 4 so as to be connected to the base 1 and the mounting assembly 2 through the handle 4.

Based on the cutter holder measuring tool 10 according to the above embodiments, the pose parameter of the cutter holder 402 can be detected accurately, conveniently and efficiently.

The method for detecting the cutter pose parameter is described as follows.

Figure 11:
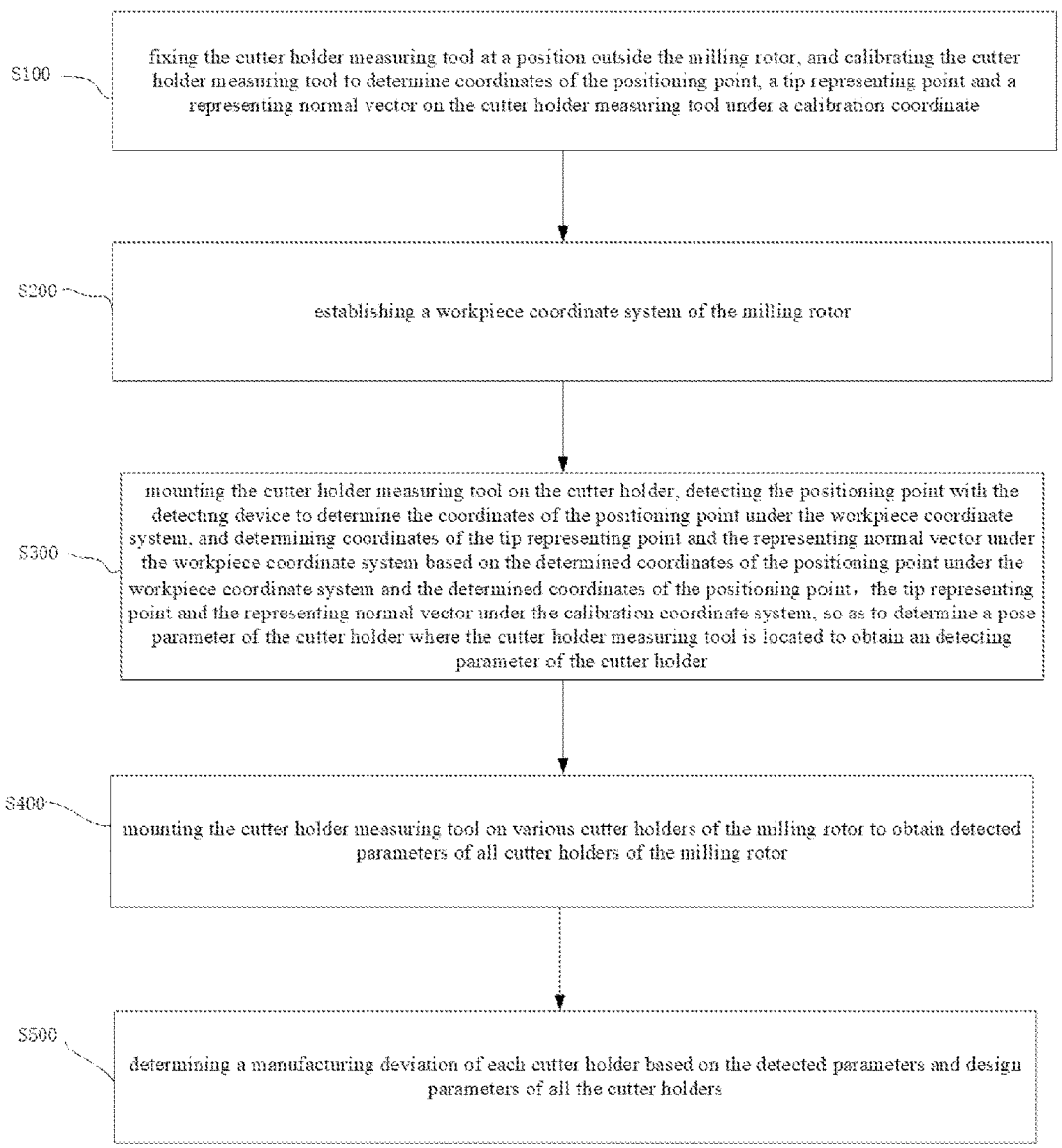
FIG. 11 is a schematic flowchart of a cutter holder pose parameter detecting method according to an embodiment of the present application.

FIG. 11 exemplarily shows the method for detecting the cutter holder pose parameter according to the present application.

Referring to FIG. 11, in the present application, the method for detecting the cutter holder pose parameter includes:

S100: fixing the cutter holder measuring tool 10 at a position outside the milling rotor 40, and calibrating the cutter holder measuring tool 10 to determine coordinates of the positioning point 12, a tip representing point and a representing normal vector on the cutter holder measuring tool 10 under a calibration coordinate system.

As defined above, the calibration coordinate system is a coordinate system established at a position outside the milling rotor 40 where the cutter holder measuring tool 10 is located; the tip representing point is a point, for representing the tip of the cutter mounted on the cutter holder 402, on the cutter holder measuring tool 10, specifically, the tip representing point is the point P0 obtained after the projection P2 of the center of the positioning pin 22 on the bottom surface 231 is translated towards the right above (that is, a direction close to the base 1) by a preset distance; and the representing normal vector is a vector, for representing the mounting normal vector of the cutter holder 402, on the cutter holder measuring tool 10, specifically, the representing normal vector is a vector P2P0 corresponding to P2 and P0.

Specifically, referring to FIG. 9, in some embodiments, in the step S100, the calibrating the cutter holder measuring tool 10 to determine coordinates of the positioning point 12, the tip representing point and the representing normal vector on the cutter holder measuring tool 10 under the calibration coordinate system includes:

detecting the positioning point 12 on the cutter holder measuring tool 10 by the detecting device 20 to determine the coordinates of the positioning point 12 under the calibration coordinate system;

determining the projection point P2 of the center of the positioning pin 22 on the bottom surface 231 of the end plate 23;

translating the projection point P2 towards right above by the preset distance L to obtain the coordinates P0 corresponding to coordinates of the tip representing point under the calibration coordinate system; and taking a connecting line of P2 and P0 as the representing normal vector P2P0, and determining the coordinates of the representing normal vector P2P0 under the calibration coordinate system.

The sequence of determining the coordinates of the positioning point 12 under the calibration coordinate system and determining the projection point P2 is not limited.

More specifically, in some embodiments, determining the projection P2 of the center of the positioning pin 22 on the bottom surface 231 of the end plate 23 includes:

making the detection member 30 of the cutter holder detecting system 100 be in contact with a plurality of points on the bottom surface 231, and detecting the calibration point 305 on the detection member 30 by the detecting device 20 when the detection member 30 is in contact with each of the plurality of points on the bottom surface 231 so as to measure the bottom surface 231;

making the detection member 30 be in contact with a plurality of points on the cylindrical surface of the positioning pin 22, and detecting the calibration point 305 on the detection member 30 by the detecting device 20 when the detection member 30 is in contact with each of the plurality of points on the cylindrical surface of the positioning pin 22, so as to measure each point, in contact with the detection member 30, on the cylindrical surface of the positioning pin 22; and projecting each measured point on the cylindrical surface of the positioning pin 22 on the bottom surface 231, and determining the projection point P2 based on the corresponding projection.

S200: establishing a workpiece coordinate system of the milling rotor 40.

Figure 10:
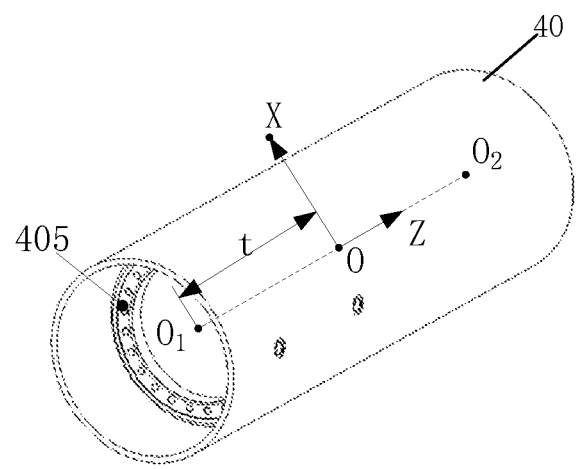
FIG. 10 is a schematic diagram of determining a workpiece coordinate system according to the present application.

Specifically, referring to FIG. 10, in some embodiments, in the step S200, the workpiece coordinate system of the milling rotor 40 is established includes:

determining centers of end faces of flanges 405 on two axial sides of the milling rotor 40; and taking the connecting line of the centers of the end faces of the flanges 405 on the two axial sides of the milling rotor 40 a Z axis, translating the center of the end face of the flange 405 on one side of the milling rotor 40 towards the middle by a preset distance t along the Z axis to serve as an original point O, and passing through the original point O to draw any straight line perpendicular to the Z axis to serve as an X axis, so as to obtain the workpiece coordinate system OXYZ of the milling rotor 40.

As an example, determining the centers of the end faces of the flanges 405 on the two axial sides of the milling rotor 40 includes:

making the detection member 30 of the cutter holder detecting system 100 be in contact with a plurality of points on the end faces on the flanges 405 on the two axial sides of the milling rotor 40 and a plurality of points on the cylindrical surface of the milling rotor 40, and detecting the calibration point 305 on the detection member 30 with the detecting device 20 when the detection member 30 is in contact with each of the plurality of points on the milling rotor 40, so as to determine the centers of the end faces of the flanges 405 on the two axial sides of the milling rotor 40.

Specifically, in some embodiments, making the detection member 30 be in contact with the plurality of points on the end faces of the flanges 405 on the two axial sides of the milling rotor 40 and the plurality of points on the cylindrical surface of the milling rotor 40, and detecting the calibration point 305 on the detection member 30 with the detecting device 20 when the detection member 30 is in contact with each of the plurality of points on the milling rotors 40 so as to determine the centers of the end faces of the flanges 405 on the two axial sides of the milling rotor 40 includes:

making the detection member 30 be in contact with the plurality of points on the end faces of the flanges 405 on the two axial sides of the milling rotor 40, and detecting the calibration point 305 on the detection member 30 by the detecting device 20 when the detection member 30 is in contact with each of the plurality of points on the end faces of the flanges 405 on the two axial sides of the milling rotor 40, so as to measure the end faces of the on the end faces of the flanges 405 on the two axial sides of the milling rotor 40;

making the detection member 30 be in contact with the plurality of points on the cylindrical surface of the milling rotor 40, and detecting the calibration point 305 on the detection member 30 with the detecting device 20 when the detection member 30 is in contact with each point on the cylindrical surface of the milling rotor 40, so as to measure each point, in contact with the detection member 30, on the cylindrical surface of the milling rotor 40; and projecting each measured point on the cylindrical surface of the milling rotor 40 on the measured end faces of the flanges 405, and determining the centers of the end faces of the flanges 405 on the two axial sides of the milling rotor 40 are determined based on the corresponding projection.

It can be understood that the sequence of the step S200 and the step S100 is not limited. The step S200 may be performed before or after the step S100, or the step S200 and the step S100 may be performed at the same time.

S300: mounting the cutter holder measuring tool 10 on the cutter holder 402, detecting the positioning point 12 with the detecting device 20 to determine the coordinates of the positioning point 12 under the workpiece coordinate system, and determining coordinates of the tip representing point and the representing normal vector under the workpiece coordinate system based on the determined coordinates of the positioning point 12 under the workpiece coordinate system and the determined coordinates of the positioning point 12, the tip representing point and the representing normal vector under the calibration coordinate system, so as to determine the pose parameter of the cutter holder 402 where the cutter holder measuring tool 10 is located to obtain an detecting parameter of the cutter holder 402.

Specifically, in some embodiments, in the step S300, determining the coordinates of the tip representing point and the representing normal vector under the workpiece coordinate system based on the determined coordinates of the positioning point 12 under the workpiece coordinate system and the determined coordinates of the positioning point 12, the tip representing point and the representing normal vector under the calibration coordinate system includes:

establishing a transformation matrix between the calibration coordinate system and the workpiece coordinate system according to the determined coordinates of the positioning point 12 under the calibration coordinate system and the workpiece coordinate system; and based on the determined transformation matrix, transforming the coordinates of the tip representing point under the calibration coordinate system into the coordinates of the tip representing point under the workpiece coordinate system, and transforming the coordinates of the representing normal vector under the calibration coordinate system into the coordinates of the representing normal vector under the workpiece coordinate system, so as to determine the coordinates of the tip representing point and the representing normal vector under the workpiece coordinate system.

After the coordinates of the tip representing point and the representing normal vector under the workpiece coordinate system are obtained, the coordinates of the tip representing point and the representing normal vector under the workpiece coordinate system can be served as the coordinates of the tip point and the mounting normal vector under the workpiece coordinate system and be substituted into the calculation formulas of the milling radius r, the axial distance d, the circumferential angle θ, the mounting angle α and the roll angle β which are determined based on the aforementioned model shown in FIG. 1 to correspondingly obtain the plurality of parameters such as the milling radius r, the axial distance d, the circumferential angle θ, the mounting angle α and the roll angle β. Of course, according to actual requirements, only one or several of the plurality of parameters such as the milling radius r, the axial distance d, the circumferential angle θ, the mounting angle α and the roll angle β may be obtained through calculation.

Based on the steps S100, S200 and S300, it is only necessary to perform the steps S100 and S200 first to establish the workpiece coordinate system, and calibrate the relative position relationship between the tip representing point and the positioning point 12 and the relative position relationship between the representing normal vector and the positioning point 12, then the step S300 is repeated to detect the coordinates of the positioning point 12 (that is, the coordinates of the positioning point 12 under the work coordinate system) when the cutter holder measuring tool 10 is mounted on each cutter holder 402, then the tips and the mounting normal vectors corresponding to all the cutter holders 402 are measured, and the pose parameters of all the cutter holders 402 are detected, thus simplicity, convenience, high efficiency and accuracy are achieved, and all the milling rotors 40 are detected rapidly and accurately before leaving the factory.

In order to measure the pose parameters of all the cutter holders 402 on the milling rotor 40, referring to FIG. 11, in some embodiments, the method for detecting the cutter holder pose parameter not only includes the steps S100, S200 and S300, but also includes the step S400: mounting the cutter holder measuring tool 10 on various cutter holders 402 of the milling rotor 40 to obtain detected parameters of all the cutter holders 402 of the milling rotor 40. Specifically, after the cutter holder measuring tool 10 is mounted on each cutter holder 402 of the milling rotor 40, the step S300 is repeated to obtain the detected parameters of all the cutter holders 402 of the milling rotor 40.

After the detected parameters of all the cutter holders 402 of the milling rotor 40 are obtained, the detected parameter of each cutter holder 402 may be compared with the design parameter to determine a manufacturing deviation of each cutter holder 402, so as to determine whether the milling rotor 40 meets the design requirement.

Therefore, referring to FIG. 11, in some embodiments, the method for detecting the cutter holder pose parameter further includes the step S500 after the step S400: determining the manufacturing deviation of each cutter holder 402 based on the detecting parameters and design parameters of all the cutter holders 402.

In a case that the corresponding relationship between each design parameter and each cutter holder 402 is clarified in advance, the obtained detected parameter of each cutter holder 402 may be directly compared with the corresponding design parameter to obtain the manufacturing deviation of each cutter holder 402.

However, under normal conditions, the milling rotor 40 has hundreds of cutter holders 402 and the corresponding relationship between each design parameter and each cutter holder 402 cannot be predicted in advance, that is, the one-to-one correspondence relationship between each design parameter and each cutter holder 402 is not confirmed in advance, in this case, it is necessary to determine the corresponding relationship between each design parameter and each cutter holder 402 first before comparing the detected parameter of each cutter holder 402 with the design parameter to obtain the manufacturing deviation of each cutter holder 402.

Figure 12:
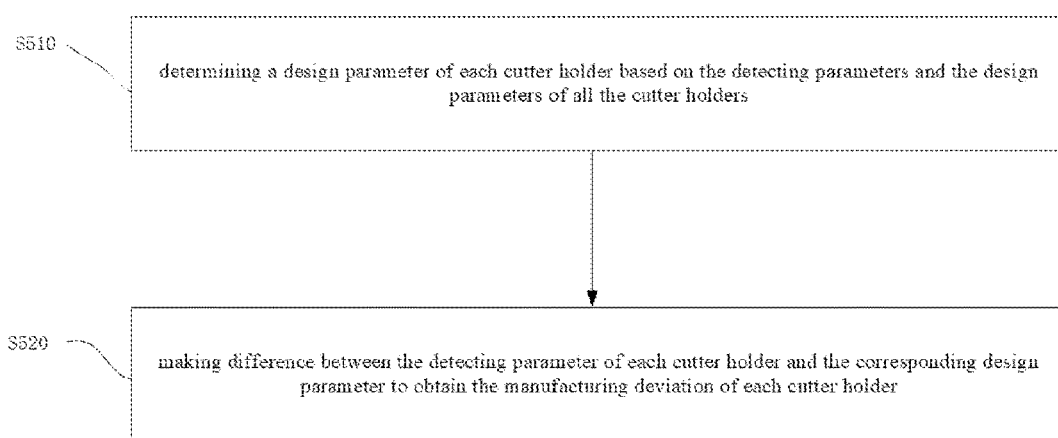
FIG. 12 is a further schematic flowchart of a step S500 according to an embodiment of the present application.

Therefore, referring to FIG. 12, in some embodiments, the step S500 that the manufacturing deviation of each cutter holder 402 is determined based on the detected parameters and the design parameters of all the cutter holders 402 includes:

S510: determining the design parameter corresponding to each cutter holder 402 based on the detecting parameters and the design parameters of all the cutter holders 402.

Figure 13:
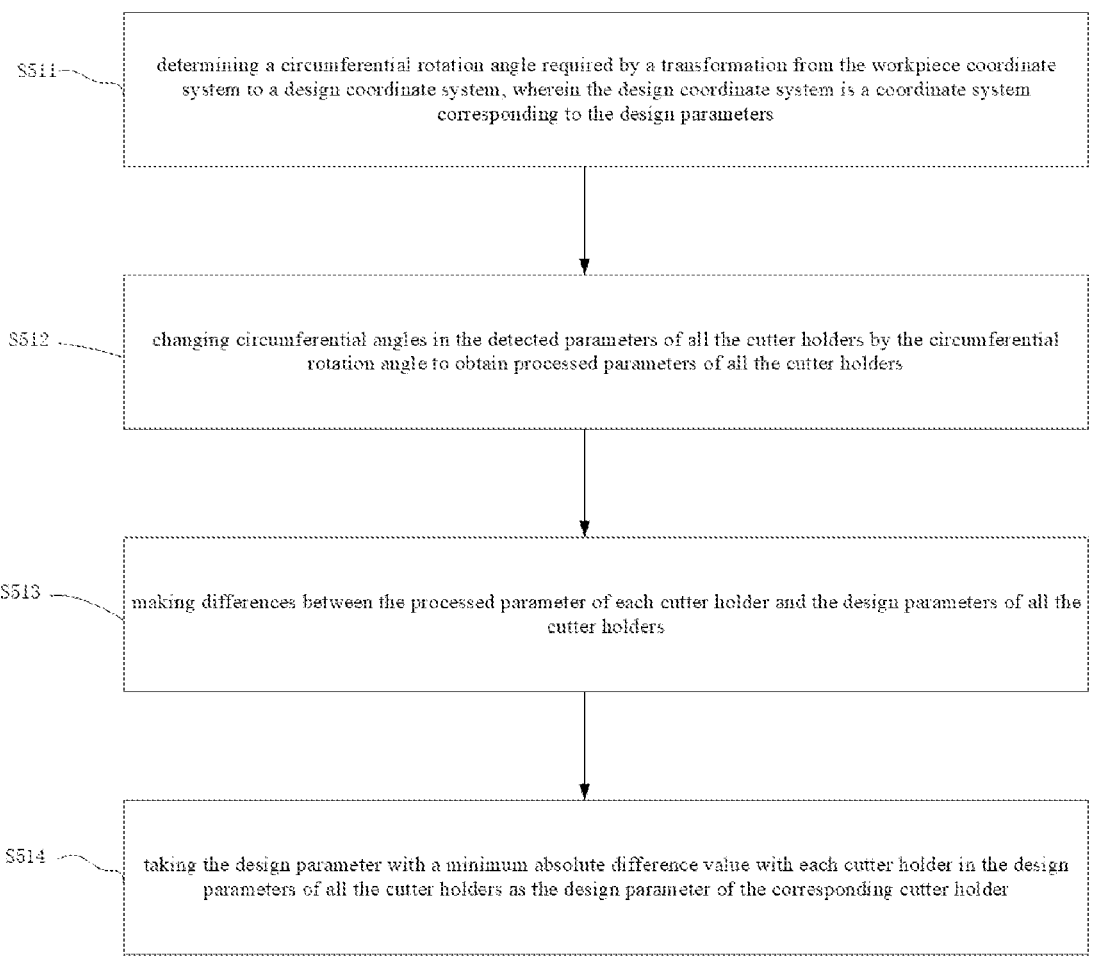
FIG. 13 is a further schematic flowchart of a step S510 according to an embodiment of the present application.

Specifically, referring to FIG. 13, in some embodiments, the step S510 that determining the design parameter of each cutter holder 402 based on the detecting parameters and the design parameters of all the cutter holders 402 includes:

S511: determining a circumferential rotation angle required by a transformation from the workpiece coordinate system to a design coordinate system, wherein the design coordinate system is a coordinate system corresponding to the design parameter;

S512: changing circumferential angles in the detected parameters of all the cutter holders 402 by the circumferential rotation angle to obtain processed parameters of all the cutter holders 402;

S513: making difference values between the processed parameter of each cutter holder 402 and the design parameters of all the cutter holders 402; and S514: taking the design parameter with a minimum absolute difference value with the processed parameter of each cutter holder 402 in the design parameters of all the cutter holders 402 as the design parameter of the corresponding cutter holder 402.

Based on the steps S511-S514, the corresponding relationship between the design parameters and the cutter holders 402 are determined by comparing each detected parameter with all the design parameters, that is, the design parameter of the cutter holder is retrieved according to the detecting parameters, so that each design parameter is in one-to-one correspondence with each cutter holder 402, and the manufacturing deviation of the cutter holder 402 is determined conveniently by subtracting the corresponding design value from the detected value of the cutter holder 402. The principle mainly lies in: generally, the difference between the detected parameter and the design parameter corresponding to the same cutter holder 402 is small and is generally less than the difference between the detected parameter and the design parameters of other cutter holders 402, therefore, it is reasonable to take the design parameter, with the minimum absolute difference value with the processed parameter of each cutter holder 402, in the design parameters of all the cutter holder 402 as the design parameter of the corresponding cutter holder 402. In this way, the problem of how to match the design parameter and the cutter holder 402 is solved cleverly.

The steps S511 and S512 are set for the reason that, the workpiece coordinate system established in the step S200 is not necessarily consistent with the design coordinate system (the coordinate system corresponding to the design parameter). Therefore, to determine the corresponding relationship between the design parameters and the cutter holders 402 by comparing each detected parameter with all the design parameters, it is necessary to transform the workpiece coordinate system corresponding to the detected parameter into the design coordinate system corresponding to the design parameter and process the detected parameter into the parameter of the design coordinate system, then it is more accurate to compare the detected parameter with the design parameter.

Between the workpiece coordinate system and the design coordinate system, the coordinate original point and the Z axis are consistent, and the difference between the workpiece coordinate system and the design coordinate system mainly lies in the difference of the X axis. Therefore, the workpiece coordinate system can be circumferentially aligned with the design coordinate system by being circumferentially rotated, thereby realize the transformation from the workpiece coordinate system to the design coordinate system. On such basis, the circumferential rotation angle required by the transformation from the workpiece coordinate system to the design coordinate system is determined first, and the detected circumferential angles of all the cutter holders 402 change the corresponding circumferential rotation angle afterwards, then the detected parameters of all the cutter holders 402 are processed to obtain the processed parameters of all the cutter holders 402.

When the circumferential rotation angle is determined, the design coordinate system is not actually present and cannot be generally determined in advance, therefore, it is difficult to directly determine the corresponding circumferential rotation angle. For this case, in some embodiments, the step S511 that determining the circumferential rotation angle required by the transformation from the workpiece coordinate system to the design coordinate system includes:

sequencing the detected parameters of all the cutter holders 402 according to an order of each cutter holder 402 in the Z direction;

after sequencing, finding any cutter holder 402 of which the axial distance is in a larger difference from axial distances of preceding and following cutter holders 402 to serve as a reference cutter holder;

determining the design parameter corresponding to a design axial distance closest to a detected axial distance corresponding to the reference cutter holder as the design parameter of the reference cutter holder; and making a difference value between the circumferential angle in the design parameter of the reference cutter holder and the circumferential angle in the detected parameter of the reference cutter holder, and taking the corresponding difference value between the corresponding circumferential angles as the circumferential rotation angle.

The above method actually is to find a cutter holder 402 capable of rapidly determine the design parameter to serve as the reference cutter holder, and then the circumferential rotation angle is determined based on the detected value and the design value of the circumferential angle of the reference cutter holder. The difference between the axial distance of the reference cutter holder and the axial distances of the preceding and following cutter holders 402 is larger, for example, the difference between the axial distance of the reference cutter holder and the axial distances of the cutter holders 402 in front of and behind the reference cutter holder is larger than 10 mm, therefore, it is easier to determine the design parameter of the reference cutter holder, and it is not easy to mistakenly take the design parameters of other cutter holders as the design parameter of the reference cutter holder.

For example, referring to the following attached table 1 and table 2, the difference between the axial distances in the detected parameters of the first three rows in the table 1 is small, in this case, it is not appropriate to choose the cutter holder corresponding to any one of the three detected parameters to serve as the reference cutter holder. As the difference among the axial distances in the three detected parameters is small, when the matching the detected parameters with the design parameters in the table 2, it is not easy to determine which design parameter in the table 2 corresponds to the three detected parameters respectively, and it is easy to make mistakes. Specifically, in the first three rows of design parameters in the table 2, the axial distances are all 1900 mm and are all close to the axial distances in the first three rows of detected parameters in the table 1, therefore, it is difficult to determine the corresponding relationship between the first three rows of design parameters and the first three rows of detected parameters in the table 1. In this case, it is difficult to determine the design parameter of any one of the three cutter holders 402, resulting in that it is impossible to obtain the required circumferential rotation angle by making a difference between the design value and the detected value of the circumferential angle.

Continuously referring to the table 1 and the table 2, in the detected parameter corresponding to the $(n+1)^{th}$ row in the table 1, the axial distance is 21.82850 and is quite different from the axial distance of 7.27538 in the previous row of detected parameter and the axial distance of 37.29700 in the next row of detected parameter. In this case, when comparing the detected parameter in the $(n+1)^{th}$ row in the table 1 with the design parameters in the table 2, it can be rapidly determined that the axial distance of 22.5 in the design parameter corresponding to R2-1 row in the table 2 is closest to the axial distance of 21.82850 and is the design parameter of the corresponding cutter holder 402. On such basis, a difference is made between the circumferential angle of 300° in the design parameter corresponding to the R2-1 row in the table 2 and the circumferential angle of 142.96900° in the detected parameter corresponding to the $(n+1)^{th}$ row in the table 1, then the required circumferential angle is obtained, that is, 300°-142.969°=157.031°, such that the processed parameters shown in the table 3 can be obtained by changing the circumferential angles in all the detected parameters by 157.031°.

After the processed parameters shown in the table 3 are obtained, making differences between the processed parameter in each row in the table 3 and all the design parameters in the table 2 according to the steps S513 and S514, obtaining an absolute difference value by taking an absolute value after the difference is made between each row of processed parameter and each row of design parameter in the table 2, then, for each row of processed parameter, all the absolute difference values are sequenced, and the design parameter corresponding to the minimum absolute difference value is taken as the design parameter of the corresponding row of processed parameter, so that the manufacturing deviation of the corresponding cutter holder is obtained.

The absolute difference value refers to a value which is obtained by making a difference between the processed parameter and each design parameter corresponding to each cutter holder 402 and taking the absolute value. It can be understood that, when the pose parameter of the cutter holder includes more than one parameter, the absolute difference value is a value obtained by taking the absolute value respectively from the difference between the processed value and the design value of each parameter of the pose parameter of the cutter holder and then performing summation.

For example, a difference is made between the first row in the table 3 and all the rows in the table 2 to obtain a table 4. Difference values are made between five parameters in the first row in the table 3 and five parameters in the first row in the table 2 respectively, and the absolute values of the differences of the five parameter values are taken and are subjected to summation to obtain the absolute difference value of the first row of processed parameter and the first row of design parameter. According to this method, making differences between the five parameter values in the first row in the table 3 and the five parameter values in the remaining rows in the Table 2, then taking absolute values of the obtained differences between all the parameters in the same row with the design parameter in each row and sum these absolute values corresponding to the same row in the Table 3 to obtain the absolute difference values of the first row of processed parameter in the table 3 and all the rows of design parameters, afterwards, all the absolute difference values corresponding to the first row of processing parameters in the table 3 are sequenced to obtain the minimum absolute value, the row number in the table 2 corresponding to the minimum absolute value is determined, then the design parameter in the corresponding rows in the table 2 is taken as the design parameter corresponding to the first row of processed parameters in the table 3. Further, the design parameters corresponding to other rows in the table 3 are retrieved with such method, then the design parameters corresponding to all the rows in the table 3 are obtained, that is, the design parameter corresponding to each cutter holder 402 is determined.

After the design parameter of each cutter holder 402 is determined, the step S520 is performed, and a difference is made between the detected parameter and the corresponding design parameter of each cutter holder 402, thereby the manufacturing deviation of each cutter holder 402 is obtained.

Based on the manufacturing deviations of all the cutter holders 402, a detecting report may be generated to serve as a basis for determining whether the milling rotor 40 meets the design requirement.

TABLE 1

Detected parameters of the milling rotor

| Serial Number | Tip Radius (mm) | Circumferential angle (°) | Axial Distance (mm) | Mounting Angle (°) | Roll angle (°) |
|---|---|---|---|---|---|
| 1 | 558.69100 | 309.74400 | −1900.88000 | 45.10620 | −46.18700 |
| 2 | 559.31000 | 182.60000 | −1900.69000 | 45.01390 | −45.55530 |
| 3 | 560.32200 | 231.87800 | −1899.22000 | 44.74870 | −45.55370 |
| ... | ... | ... | ... | ... | ... |
|  | 569.46900 | 111.39900 | −1834.77000 | 40.77200 | −9.38768 |
|  | 569.22700 | 344.85300 | −1821.23000 | 40.71720 | −9.08446 |
| ... | 569.17600 | 216.55400 | −1806.53000 | 40.66140 | −9.79133 |
| ... | ... | ... | ... | ... | ... |
| n − 1 | 569.49400 | 17.02670 | 7.27538 | 40.52200 | −6.97380 |
| n | 569.84700 | 142.96900 | 21.82850 | 40.13620 | −6.82074 |
| n + 1 | 570.33400 | 268.85600 | 37.29700 | 40.36950 | −7.15860 |
| ... | ... | ... | ... | ... | ... |
|  | 560.23200 | 174.08400 | 1900.75000 | 45.35250 | 44.34000 |
|  | 559.69700 | 123.92600 | 1900.85000 | 44.64430 | 44.74690 |
|  | 559.85600 | 250.40200 | 1901.92000 | 45.00280 | 45.68570 |

TABLE 2

Design parameters of the milling rotor

| Serial Number | Tip Radius (mm) | Circumferential angle (°) | Axial Distance (mm) | Mounting Angle (°) | Roll angle (°) |
|---|---|---|---|---|---|
| ZB-1 | 560 | 339.55 | −1900 | 45 | −45 |
| ZB-4 | 560 | 28.95 | −1900 | 45 | −45 |
| ZB-6 | 560 | 106.85 | −1900 | 45 | −45 |
| ... | ... | ... | ... | ... | ... |
| ZB-13 | 570 | 268.55 | −1837.4 | 40 | −10 |
| ZB-8 | 570 | 141.95 | −1822.5 | 40 | −10 |
| ZB-3 | 570 | 13.65 | −1807.5 | 40 | −10 |
| ... | ... | ... | ... | ... | ... |
| R1-1 | 570 | 174.15 | 7.5 | 40 | −7 |
| R2-1 | 570 | 300 | 22.5 | 40 | −7 |
| R3-1 | 570 | 65.85 | 37.5 | 40 | −7 |
| ... | ... | ... | ... | ... | ... |
| YB-9 | 560 | 331.2 | 1900 | 45 | 45 |
| YB-11 | 560 | 47.6 | 1900 | 45 | 45 |
| YB-14 | 560 | 96.8 | 1900 | 45 | 45 |

TABLE 3

Processed parameters of the milling rotor

| Serial Number | Tip Radius (mm) | Circumferential angle (°) | Axial Distance (mm) | Mounting Angle (°) | Roll angle (°) |
|---|---|---|---|---|---|
| 1 | 558.69100 | 106.77500 | −1900.88000 | 45.10620 | −46.18700 |
| 2 | 559.31000 | 339.63100 | −1900.69000 | 45.01390 | −45.55530 |
| 3 | 560.32200 | 28.90900 | −1899.22000 | 44.74870 | −45.55370 |
| 4 | 559.76600 | 282.67700 | −1898.63000 | 45.71480 | −44.91860 |
| 5 | 560.28200 | 157.03100 | −1898.55000 | 44.68700 | −45.44400 |
| 6 | 559.24200 | 233.41690 | −1898.21000 | 44.63100 | −45.28110 |
| 7 | 569.45600 | 93.15450 | −1880.55000 | 40.44140 | −33.97070 |
| 8 | ... | ... | ... | ... | ... |

TABLE 4

Absolute values of differences between the first row of the detected parameter and all the design parameters

| Serial Number | Tip Radius (mm) | Circumferential angle (°) | Axial Distance (mm) | Mounting Angle (°) | Roll angle (°) |
|---|---|---|---|---|---|
| ZB-1 | 1.309 | 232.775 | 0.88 | 0.1062 | 1.187 |
| ZB-4 | 1.309 | 77.825 | 0.88 | 0.1062 | 1.187 |
| ZB-6 | 1.309 | 0.075 | 0.88 | 0.1062 | 1.187 |
| ZB-9 | 1.309 | 50.275 | 0.88 | 0.1062 | 1.187 |
| ZB-11 | 1.309 | 126.675 | 0.88 | 0.1062 | 1.187 |
| ZB-14 | 1.309 | 176.175 | 0.88 | 0.1062 | 1.187 |
| ZB-12 | 11.309 | 143.475 | 18.38 | 5.1062 | 11.187 |
| ... | ... | ... | ... | ... | ... |

The present application is further described with reference to the embodiments shown in FIG. 2 to FIG. 10.

As shown in FIG. 2 to FIG. 10, in the embodiment, the cutter holder detecting system 100 includes a cutter holder measuring tool 10, a detecting device 20 and a detection member 30. The cutter holder measuring tool 10 is configured to be detachably mounted on the cutter holder 402 and cooperate with the detection member 30 and the detecting device 20 to measure the tip and the mounting normal vector, thereby determining the pose parameter of the cutter holder 402 conveniently.

The cutter holder measuring tool 10 and the detection member 30 are provided with a positioning point 12 and a calibration point 305 respectively. The positioning point 12 and the calibration point 305 can be identified by the detecting device 20. The detecting device 20 detects the positioning point 12 and the calibration point 305 to calibrate the relative position relationship between the positioning point 12 and the tip and the relative position relationship between the positioning point 12 and the mounting normal vector, establish the workpiece coordinate system and determine the coordinates of the positioning point 12 (that is, the coordinates of the positioning point 12 under the workpiece coordinate system) when the cutter holder measuring tool 10 is mounted on each cutter holder 402, so that the coordinates of the tip and the mounting normal vector under the workpiece coordinate system are measured, and the pose parameter (such as the milling radius r, the axial direction d, the circumferential angle θ, the mounting angle α and the roll angle β) of the cutter holder 402 is detected based on the coordinates of the tip and the mounting normal vector under the workpiece coordinate system.

FIG. 2 and FIG. 3 show a structure of the detecting device 20 in this embodiment. As shown in FIG. 2 and FIG. 3, in this embodiment, the detecting device 20 includes two cameras 201, the two cameras 201 are symmetrically arranged on a bracket (not shown in the figure), and the view of the two cameras 201 covers the measurement range of the whole milling rotor 40. The two cameras 201 photograph an image of the positioning point 12 and transmits the image to an industrial personal computer, so that a space pose of the positioning point 12 is determined based on a triangulation principle, that is, the three-dimensional coordinates of the positioning point 12 are detected.

FIG. 3 to FIG. 7 show a structure of a cutter holder measuring tool 10 in this embodiment. As shown in FIG. 3 to FIG. 7, in the embodiment, the cutter holder measuring tool 10 includes a base 1, a mounting assembly 2, a handle 4 and an operating button 3.

The base 1 includes a frame 13, two mounting blocks 14 and three point units 11. The frame 13 is made of aluminum alloy and is roughly of a triangle, specifically, is roughly of an equilateral triangle. The two mounting blocks 14 are mounted on two vertexes of the frame 13 and protrudes towards one side in a thickness direction of the frame 13 relative to the frame 13. Two of the three point units 11 are arranged on the two mounting blocks 14 respectively, and the other one is directly arranged on the other vertex of the frame 13. In this way, in the three point units 11, the two point units 11 located on the two mounting blocks 14 are coplanar, and the point unit 11 directly located on the frame 13 and the point units 11 located on the two mounting blocks 14 are on different planes and there is an offset S (referring to FIG. 5) in the thickness direction of the frame 13 therebetween. The three point unit 11 have the same structure and all include three positioning points 12. On such basis, the base 1 is provided with three groups of positioning points 12, the three groups of positioning points 12 are parallel mutually, and one group of positioning points 12 and the other two groups of positioning points have a certain offset S in a normal direction. In this way, the detecting device 20 can accurately identify the poses of the positioning points 12, and subsequently can determine the transformation matrix between the calibration coordinate system and the workpiece coordinate system based on the three groups of positioning points 12.

The mounting assembly 2 includes a sleeve 21, an end plate 23, a positioning pin 22, a spring 241 and a magnet 251.

Two axial ends of the sleeve 21 are connected to the base 1 and the end plate 23 respectively. The end plate 23 is fitted with the mounting surface 403 of the cutter holder 402 through the bottom surface 231 of the end plate 23.

The positioning pin 22 is configured to be inserted into the mounting hole 404 of the cutter holder 402. The first end of the positioning pin 22 is located in the sleeve 21, and the second end extends out of the sleeve 21 to be inserted into the mounting hole 404. Moreover, the positioning pin 22 is slidably fitted in the sleeve 21, so that the positioning pin 22 can move relative to the sleeve 21 along the axial direction. A shaft shoulder 221 is arranged between the first end and the second end of the positioning pin 22, and a limiting part 211 protruding inwards is arranged on the inner wall of the sleeve 21. The shaft shoulder 221 cooperates with the limiting part 211 to limit the maximum displacement of the positioning pin 22 extending out of the sleeve 21.

As shown in FIG. 6, in the embodiment, the positioning pin 22 is tapered and has a taper φ greater than 1° and less than or equal to 5°, and the diameter of the positioning pin 22 decreases along a direction from the first end to the second end, wherein the maximum diameter of the positioning pin 22 is larger than the design value of the diameter of the mounting hole 404 by a first deviation value, the minimum diameter is less than the design value of the diameter of the mounting hole 404 by a second deviation value, and the first deviation value and the second deviation value are equal and are both 0.5 mm. For example, assuming that the design value of the diameter of the mounting hole 404 is 10 mm, then the maximum diameter of the positioning pin 22 is 10.5 mm and the minimum diameter of the positioning pin 22 is 9.5 mm.

The positioning pin 22 can move in the axial direction and the diameter changes in the axial direction, therefore, the positioning pin 22 can perform self-centering in the process of being inserted into the mounting hole 404. Furthermore, the guide distance of the positioning pin 22 in the embodiment is longer, therefore, the centering accuracy is higher.

The spring 241 which serves as an elastic member 24 is arranged between the first end of the positioning pin 22 and the sleeve 21 and abuts against the sleeve 21 and the positioning pin 22, so as to apply an elastic force, for driving the positioning pin 22 to move out of the sleeve 21, to the positioning pin 22. As shown in FIG. 6 and FIG. 7, under the pre-pressing action of the spring 241, the shaft shoulder 221 of the positioning pin 22 is fitted with the limiting part 211 of the sleeve 21 to limit the maximum displacement of the positioning pin 22 extending out of the sleeve 21.

The magnet 251 which serves as a magnetic member 25 is arranged on the sleeve 21 and applies a magnetic attraction force to the end plate 23. As shown in FIG. 5 and FIG. 6, in the embodiment, the sleeve 21 is provided with a limiting hole 213, and the magnet 251 is arranged in the limiting hole 213 and is in contact with the end plate 23 to apply a magnetic attraction force to the end plate 23. In this way, when the cutter holder measuring tool 10 and the cutter holder 402 are assembly, a magnetic force generated by the magnet 251 is transmitted to the mounting surface 403 by the end plate 23 and absorb the end plate 23 onto the mounting surface 403, so that the bottom surface 231 of the end plate 23 is closely attached to the mounting surface 403, the assembling stability between the cutter holder measuring tool 10 and the cutter holder 402 is improved, and the end plate 23 can perform orientation more accurately and reliably.

In order to reduce the influence on the positioning pin 22 by the magnet 251, in this embodiment, the positioning pin 22 is made of a material with weak magnetic conductivity so as to avoid the influence on the centering accuracy caused by the fact that the positioning pin 22 and the mounting hole 404 are adsorbed together.

The handle 4 is arc-shaped, and two ends of the handle 4 are connected to the frame 13 and the sleeve 21 respectively, so that the connection reliability of the base 1 and the mounting assembly 2 and the structural stability of the cutter holder measuring tool 10 are improved.

The operating button 3 is arranged on the handle 4 and is specifically a press button 31. The press button 31 is in signal connection with the two cameras 201, so that after the cutter holder measuring tool 10 and the cutter holder 402 are mounted and clamped, the press button 31 is pressed down, the two cameras 201 are triggered to acquire the images of the positioning points 12 on the cutter holder measuring tool 10, so as to calculate the coordinates of the positioning points 12 based on the triangulation principle and matching algorithm, thereby the pose parameter of the cutter holder 402 obtained through calculation.

A process of mounting the cutter holder measuring tool 10 on the cutter holder 402 is roughly divided into two processes, that is, a centering process and an orientation process. The centering process is realized through cooperation between the positioning pin 22 and the mounting hole 404, wherein the positioning pin 22 moves relative to the sleeve 21 to change the insertion depth into the mounting hole 404, so that the positioning pin 22 realizes a self-centering process by cooperating with the mounting hole 404 through a part matched with the diameter of the mounting hole 404. The orientation process is realized based on the cooperation between the magnet 251 and the end plate 23 as well as the mounting surface 403, wherein the magnet 251 adsorbs the bottom surface 231 of the end plate 23 and the mounting surface 403 together, so that the bottom surface 231 is tightly fitted with the mounting surface 403 to realize a self-orienting process.

The detection member 30 is configured to be in contact with the milling rotor 40 and the mounting assembly 2 and cooperate with the detecting device 20 to determine the projects of the centers of the end faces of the flanges 405 on the two axial sides of the milling rotor 40 and the center of the positioning pin 22 on the bottom surface 231 of the end plate 23, so as to establish the workpiece coordinate system, and determine the relative position relationship between the positioning point 12 and the tip as well as the mounting normal vector.

Figure 8:
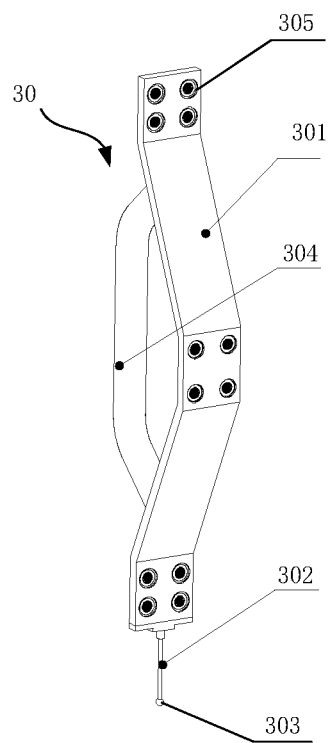
FIG. 8 is a schematic structural diagram of a detection member according to an embodiment of the present application.

FIG. 8 shows a structure of a detection member 30 in the embodiment. As shown in FIG. 8, in the embodiment, the detection member 30 includes a base plate 301 and a measuring head 303. The base plate 301 is provided with a calibration point 305. The measuring head 303 is connected to the base plate 301 and is spherical. The detection member 30 is in contact with the milling rotor 40 and the mounting assembly 2 through the measuring head 303.

Specifically, it can be seen from FIG. 8 that in this embodiment, the base plate 301 is a folded plate, a middle part of the base plate 301 protrudes relative to two ends of the base plate 301, and the two ends and the middle part of the base plate 301 are provided with a group of calibration points 305 respectively. In this way, one group of the three groups of calibration points 305 on the base plate 301 and the other two groups of calibration points 305 are on different planes, thereby facilitating the camera 201 to identify. As shown in FIG. 8, in this embodiment, each group of calibration points 305 includes four calibration points 305.

The measuring head 303 is a spherical ruby and is connected to the base plate 301 through a connecting rod 302, in other words, two ends of the connecting rod 302 are connected to the base plate 301 and the measuring head 303 respectively.

During use, the detection member 30 is in contact with a plane or a cylindrical surface through the measuring head 303, the two cameras 201 photograph images of the calibration points 305 on the detection member 30 and transmits pictures to an industrial personal computer, the industrial personal computer performs calculation to obtain the coordinates of the calibration points 305 based on the triangulation principle, so that the coordinates of the center of the measuring head 303 can be determined according to the pre-determined relative position relationship between the calibration point 305 and the center of the measuring head 303, thus the corresponding point on the plane or the cylindrical surface is measured. According to this method, the plane can be determined by measuring and fitting a plurality of points on the plane. In addition, according to this method, a plurality of points on the cylindrical surface are measured, and the measured points on the cylindrical surface are projected to a certain plane, then a circle corresponding to a circular hole can be obtained through fitting. On such basis, the center of the corresponding circle is determined, and then the projection of the center of the circular hole on the corresponding plane can be determined.

Based on the above principle, the detection member 30 is made to be in contact with plurality of points on the bottom surface 231 of the end plate 23 and the cylindrical surface of the positioning pin 22, the calibration points 305 on the detection member 30 are detected by the two cameras 201, then the projection of the center of the positioning pin 22 on the bottom surface 231 can be determined. The center of the positioning pin 22 and the center of the mounting hole 404 are collinear, and the bottom surface 231 is fitted with the mounting surface 403, therefore, the projection of the center of the positioning pin 22 on the bottom surface 231 is the projection of the center of the mounting hole 404 on the mounting surface 403. On such basis, the tip representing point and the representing normal vector can be measured with reference to FIG. 9.

In addition, based on the above principle, the measuring head 303 of the detection member 30 is made to be in contact with a plurality of points on outer end faces of the flanges 405 and the cylindrical surface of the drum 401, and the calibration points 305 on the detection member 30 are detected by the two cameras 201, then the projections of the center of the milling rotor 40 on the outer end faces of the flanges 405 can be determined, that is, the centers of the outer end faces of the flanges 405 can be determined. On such basis, the workpiece coordinate system of the milling rotor 40 can be established with reference to FIG. 10.

In addition, as shown in FIG. 8, in this embodiment, the detection member 30 further includes a grasping part 304, and the grasping part 304 is connected to the base plate 301, specifically, the grasping part 304 is connected to a surface, not provided with the calibration point 305, of the base plate 301. In this way, in the detecting process, the detection member 30 can be manipulated conveniently through grasping the grasping part 304.

Based on the cutter holder detecting system 100 in the embodiment, the process of detecting the pose parameters of the cutter holders 402 on the milling rotor 40 mainly includes the following five steps.

The first step, calibration of the cutter holder measuring tool 10: the cutter holder measuring tool 10 is fixed at a position outside the milling rotor 40, the surface, provided with the positioning point 12, of the base 1 faces the two cameras 201, and then the images of the positioning points 12 on the cutter holder measuring tool 10 is acquired by the two cameras 201 to determine the coordinates of the positioning points 12 under the calibration coordinate system, in addition, under the calibration coordinate system, the bottom surface 231 of the end plate 23 is measured by the detection member 30 and the two cameras 201, and the projection P2 of the center of the positioning pin 22 on the bottom surface 231 is determined, and then, referring to FIG. 9, the projection point P2 is translated towards the right above by a distance L to obtain the tip representing point P0, and the representing normal vector P2P0 is established based on P2 and P0, then the coordinates $(x_0, y_0, z_0)$ of the tip representing point P0 under the calibration coordinate system and the coordinates $(w_0, p_0, r_0)$ of the representing normal vector P2P0 under the calibration coordinate system can be determined, so that the relative position relationship between the positioning point 12 and the tip representing point P0 and the relative position relationship between the positioning point 12 and the representing normal vector P2P0 can be determined based on the determined coordinates of the positioning point 12, the tip representing point P0 and the representing normal vector P2P0 under the calibration coordinate system, thereby the cutter holder measuring tool 10 being calibrated.

The second step, establishment of the workpiece coordinate system of the milling rotor 40: the detection member 30 is made to be in contact with a plurality of points of the outer end faces of the two flanges 405, and in this process, the calibration points 305 of the detection member 30 are detected by the two cameras 201, so as to measure the outer end faces of the two flanges 405, then, the detection member 30 is made to be in contact with a plurality of points of the cylindrical surface of the drum 401, and in this process, the calibration points 305 of the detection member 30 are detected by the two cameras 201, so as to measure the plurality of points on the cylindrical surface of the drum 401, then, the measured plurality of points on the cylindrical surface of the drum 401 are projected to the measured outer end faces of the two flanges 405 to determine the centers O1 and O2 of the outer end faces of the two flanges 405, on such basis, referring to FIG. 10, the connecting line of the centers O1 and O2 of the two circular holes are taken as the Z axis, the center O1 is translated towards the middle of the Z axial direction by a distance t to serve as the original point O, the connecting line of the original point O and the projection points of any tip point on the OXY plane are taken as the X axis, then the workpiece coordinate system OXYZ of the milling rotor 40 can be established.

The third step, measurement of the pose parameter of the cutter holder: high-accuracy mounting and clamping of the cutter holder measuring tool 10 and the cutter holder 402 is realized by the centering function of the positioning pin 22 and the magnetic attraction orientation function of the magnet 251; then the button 31 is pressed down, to trigger the two cameras 201 to detect the positioning points 12 on the cutter holder measuring tool 10, so as to determine the coordinates of the positioning points 12 under the workpiece coordinate system; then, a transformation matrix (including a rotation matrix R and a translation matrix T) between the calibration coordinate system and the workpiece coordinate system is calculated based on the coordinates of the positioning points 12 under the workpiece coordinate system and the coordinates of the positioning points 12 in the first step under the calibration coordinate system; then, the coordinates of the tip representing point P0 and the representing normal vector P2P0 under the workpiece coordinate system are obtained through transformation and calculation based on the determined transformation matrix, the relative position relationship determined in the first step between the positioning points 12 and the tip representing point P0 as well as the representing normal vector P2P0, that is, the coordinates of the tip and the mounting normal vector under the workpiece coordinate system are obtained; and on such basis, referring to the calculation model shown in FIG. 1, the coordinates of the tip and the mounting normal vector under the workpiece coordinate system are substituted into the calculation formulas of the milling radius r, the axial distance d, the circumference angel θ, the mounting angle α and the roll angle β to obtain the parameters such as the milling radius r, the axial distance d, the circumferential angle θ, the mounting angle α and the roll angle β, thereby realizing the measurement of the pose parameter of the cutter holder 402.

The fourth step, the third step is repeated until all the cutter holders 402 are measured, and the pose parameters of all the cutter holders 402 are obtained.

The fifth step, retrieval and analysis of the design parameters: according to the obtained pose parameters of all the cutter holders 402, the design parameters are retrieved to determine the corresponding relationship between each design parameter and the detected parameter of each cutter holder 402; then, differences are made between the detected parameter of the cutter holder 402 and the design parameters of all the cutter holders 402, the absolute difference values are sequenced, and then, the design parameter corresponding to the minimum absolute difference value is determined as the design parameter of the corresponding cutter holder 402, and the minimum absolute difference value is determined as the manufacturing deviation of the corresponding cutter holder 402, thus a manufacturing deviation report is issued after the manufacturing deviations of all the cutter holders 402 are obtained.

It can be seen that in the whole detecting process, it is only necessary to establish the workpiece coordinate system in advance, calibrate the relative position relationship between the tip and the positioning point 12 and the relative position relationship between the mounting normal vector and the positioning point 12, and detect the coordinates of the positioning point (that is, the coordinates of the positioning point 12 under the work coordinate system) when the cutter holder measuring tool 10 is mounted on each cutter holder 402, then the pose parameters of all the cutter holders 402 can be measured conveniently. It is unnecessary to directly detect the tip and the mounting normal vector of each cutter holder 402, therefore, the detecting efficiency of the pose parameter of the cutter holder is effectively improved, all the milling rotors are detected conveniently before leaving the factory, and it is convenient to control all the delivered milling rotors to meet the design requirement, thereby the operation efficiency and reliability of the milling rotor and milling construction equipment being improved. Tests show that it only takes 5-10 s to complete one measurement period from mounting of the cutter holder measuring tool 10 and pose measurement to the disassembly of the cutter holder measuring tool 10, and the time w for measuring the whole milling rotor is 20-30 minutes, therefore, the detecting efficiency is significantly improved.

Furthermore, the cutter holder measuring tool 10 with a "tapered+magnetic attraction" structure can perform self-centering and self-orientation, therefore, the assembling and adjusting time of the cutter holder measuring tool 10 and the cutter holder 402 is reduced, the processing deviation of the mounting hole 404 of the cutter holder 402 is compensated, and the measurement accuracy of the pose parameter of the cutter holder 402 is improved.

In conclusion, the cutter holder detecting system 100 in the embodiment is simple in structure and convenient to operate, can efficiently and accurately measure the pose parameter of the cutter holder and significantly reduce the labor intensity and operation time of quality controlling personnel.

The above are only exemplary embodiments of the present application and are not intended to limit the present application. Any modifications, equivalent substitutions, improvements and the like made within the spirits and principles of the present application should be included in the protection scope of the present application.

What is claimed is:

1. A cutter holder measuring tool, comprising:
    a base with a positioning point configured to be detected by a detecting device; and
    a mounting assembly, comprising a sleeve, a positioning pin and an end plate, wherein two axial ends of the sleeve are connected to the base and the end plate respectively, the end plate is configured to abut against a mounting surface of a cutter holder of a milling rotor, the mounting surface is a surface, facing a tip of a cutter, of the cutter holder, the positioning pin is inserted into the sleeve and a mounting hole, for the cutter to insert, of the cutter holder, the positioning pin is movable along an axial direction of the sleeve, and a diameter of the positioning pin changes along the axial direction of the sleeve, so that a center of the positioning pin is collinear with a center of the mounting hole.

2. The cutter holder measuring tool according to claim 1, wherein the positioning pin is configured as at least one of the following:
    the diameter of the positioning pin decreases or increases along a direction from the base to the end plate;
    a maximum diameter of the positioning pin is larger than a design value of the diameter of the mounting hole by a first deviation value, and a minimum diameter of the positioning pin is less than the design value of the diameter of the mounting hole by a second deviation value; and
    the positioning pin is tapered.

3. The cutter holder measuring tool according to claim 1, comprising at least one of the following:
    an elastic member, arranged in the sleeve to apply an elastic force to the positioning pin to drive the positioning pin to move out of the sleeve;
    a magnetic member, arranged on the sleeve to apply a magnetic force to the mounting surface through the end plate, so that the end plate is adsorbed on the mounting surface;
    a limiting part, arranged on an inner wall of the sleeve to limit a displacement of the positioning pin extending out of the sleeve;
    an operating button, connected to the base and/or the mounting assembly and configured to be in a signal connection with the detecting device, so as to trigger the detecting device to detect the positioning point when being operated; and
    a handle, connecting the base with the sleeve.

4. The cutter holder measuring tool according to claim 1, wherein the base is provided with a plurality of point units, and each of the point units comprises at least one positioning point.

5. The cutter holder measuring tool according to claim 4, wherein at least two of the plurality of point units are on different planes; and/or, each of the point units comprises at least two positioning points, and the at least two positioning points in the same point unit are coplanar.

6. A cutter holder detecting system, comprising a detecting device and the cutter holder measuring tool according to claim 1, wherein the detecting device is configured to detect the positioning point on the base to determine coordinates of the positioning point.

7. The cutter holder detecting system according to claim 6, comprising a detection member, wherein the detection member is provided with a calibration point configured to be detected by the detecting device, the detection member is configured to be in contact with the milling rotor and the mounting assembly, and cooperate with the detecting device to determine centers of end faces of flanges on two axial sides of the milling rotor and a projection of the center of the positioning pin on a bottom surface of the end plate, and the bottom surface of the end plate is a surface of the end plate for being in contact with the cutter holder.

8. A method for detecting a cutter holder pose parameter using the cutter holder detecting system according to claim 6, comprising:
    fixing the cutter holder measuring tool at a position outside the milling rotor, and calibrating the cutter holder measuring tool to determine coordinates of the positioning point, a tip representing point and a representing normal vector on the cutter holder measuring tool under a calibration coordinate system, wherein the tip representing point is a point, for representing the tip of the cutter mounted on the cutter holder, on the cutter holder measuring tool, the representing normal vector is a vector, for representing a mounting normal vector of the cutter holder, on the cutter holder measuring tool, the mounting normal vector is a normal vector of the mounting surface of the cutter holder, and the calibration coordinate system is a coordinate system established at a position outside the milling rotor where the cutter holder measuring tool is located;

establishing a workpiece coordinate system of the milling rotor; and mounting the cutter holder measuring tool on the cutter holder, detecting the positioning point with the detecting device to determine the coordinates of the positioning point under the workpiece coordinate system, and determining coordinates of the tip representing point and the representing normal vector under the workpiece coordinate system based on the determined coordinates of the positioning point under the workpiece coordinate system and the determined coordinates of the positioning point, the tip representing point and the representing normal vector under the calibration coordinate system, so as to determine a pose parameter of the cutter holder where the cutter holder measuring tool is located to obtain an detecting parameter of the cutter holder, wherein the pose parameter of the cutter holder comprises at least one of a milling radius, an axial distance, a circumferential angle, a mounting angle and a roll angle.

9. The method for detecting the cutter holder pose parameter according to claim 8, wherein calibrating the cutter holder measuring tool to determine coordinates of the positioning point cutter, the tip representing point and the representing normal vector on the cutter holder measuring tool under the calibration coordinate system comprises:

detecting the positioning point on the cutter holder measuring tool by the detecting device to determine the coordinates of the positioning point under the calibration coordinate system;

determining a projection point P2 of the center of the positioning pin on a bottom surface of the end plate, wherein the bottom surface of the end plate is a surface of the end plate configured to be in contact with the cutter holder;

translating the projection point P2 towards right above by a preset distance L to obtain P0 corresponding to coordinates of the tip representing point under the calibration coordinate system; and taking a connecting line of P2 and P0 as the representing normal vector P2P0, and determining the coordinates of the representing normal vector P2P0 under the calibration coordinate system.

10. The method for detecting the cutter holder pose parameter according to claim 8, wherein determining coordinates of the tip representing point and the representing normal vector under the workpiece coordinate system based on the determined coordinates of the positioning point under the workpiece coordinate system and the determined coordinates of the positioning point, the tip representing point and the representing normal vector under the calibration coordinate system comprises:

establishing a transformation matrix between the calibration coordinate system and the workpiece coordinate system according to the determined coordinates of the positioning point under the calibration coordinate system and the workpiece coordinate system; and based on the determined transformation matrix, transforming the coordinates of the tip representing point under the calibration coordinate system into the coordinates of the tip presenting point under the workpiece coordinate system, and transforming the coordinates of the representing normal vector under the calibration coordinate system into the coordinates of the representing normal vector under the workpiece coordinate system, so as to determine the coordinates of the tip representing point and the representing normal vector under the workpiece coordinate system.

11. The method for detecting the cutter holder pose parameter according to claim 8, comprising:

mounting the cutter holder measuring tool on various cutter holders of the milling rotor to obtain detected parameters of all cutter holders of the milling rotor.

12. The cutter holder pose parameter detecting method according to claim 11, comprising:

determining a manufacturing deviation of each cutter holder based on the detected parameters and design parameters of all the cutter holders.

13. The method for detecting the cutter holder pose parameter according to claim 12, wherein determining the manufacturing deviation of each cutter holder based on the detecting parameters and the design parameters of all the cutter holders comprises:

determining a design parameter of each cutter holder based on the detecting parameters and the design parameters of all the cutter holders; and making difference between the detecting parameter of each cutter holder and the corresponding design parameter to obtain the manufacturing deviation of each cutter holder.

14. The method for detecting the cutter holder pose parameter according to claim 13, wherein determining the design parameter of each cutter holder based on the detecting parameters and the design parameters of all the cutter holders comprises:

determining a circumferential rotation angle required by a transformation from the workpiece coordinate system to a design coordinate system, wherein the design coordinate system is a coordinate system corresponding to the design parameters;

changing circumferential angles in the detected parameters of all the cutter holders by the circumferential rotation angle to obtain processed parameters of all the cutter holders;

making difference between the processed parameter of each cutter holder and the design parameters of all the cutter holders; and taking the design parameter with a minimum absolute difference value with the processed parameter of each cutter holder in the design parameters of all the cutter holders as the design parameter of the corresponding cutter holder.

15. The method for detecting the cutter holder pose parameter according to claim 14, wherein determining the circumferential rotation angle required by the transformation from the workpiece coordinate system to the design coordinate system comprises:

sequencing the detected parameters of all the cutter holders according to an order of each cutter holder in a Z direction;

after sequencing, finding any cutter holder of which an axial distance is in a larger difference from axial distances of preceding and following cutter holders to serve as a reference cutter holder;

determining a design parameter corresponding to a design axial distance closest to a detected axial distance corresponding to the reference cutter holder as the design parameter of the reference cutter holder; and making a difference value between the circumferential angle in the design parameter of the reference cutter holder and the circumferential angle in the detected parameter of the reference cutter holder, and taking the corresponding difference value between the corresponding circumferential angles as the circumferential rotation angle.

\* \* \* \* \*